(12) United States Patent
Iwata et al.

(10) Patent No.: US 12,275,583 B2
(45) Date of Patent: Apr. 15, 2025

(54) TRANSPORT VEHICLE

(71) Applicant: Daifuku Co., Ltd., Osaka (JP)

(72) Inventors: Masashige Iwata, Hinocho (JP);
Kazunari Kimura, Hinocho (JP);
Hiroyoshi Murata, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 384 days.

(21) Appl. No.: 17/742,443

(22) Filed: May 12, 2022

(65) Prior Publication Data

US 2022/0363476 A1 Nov. 17, 2022

(30) Foreign Application Priority Data

May 13, 2021 (JP) ................................. 2021-081805

(51) Int. Cl.
*B65G 1/04* (2006.01)
(52) U.S. Cl.
CPC ......... *B65G 1/0428* (2013.01); *B65G 1/0435* (2013.01)
(58) Field of Classification Search
CPC .... B60G 2200/132; B60G 3/12; B60G 7/001; B60G 7/02; B60G 7/04; B60G 2204/182; B65G 1/0428; B65G 1/0435; A01F 12/46; B62D 63/02; B62D 63/04; B60L 2220/46
See application file for complete search history.

(56) References Cited

U.S. PATENT DOCUMENTS

| | | | | |
|---|---|---|---|---|
| 2007/0001421 | A1* | 1/2007 | Pierce | B62D 53/068 180/209 |
| 2010/0207346 | A1* | 8/2010 | VanDenberg | B60G 11/225 267/64.11 |
| 2014/0020966 | A1* | 1/2014 | Lee | B60K 17/046 180/55 |
| 2019/0054787 | A1* | 2/2019 | Fulton | B60G 7/04 |
| 2021/0309060 | A1* | 10/2021 | Stelman | B62D 63/04 |
| 2022/0118807 | A1* | 4/2022 | Pan | B60G 13/003 |

FOREIGN PATENT DOCUMENTS

| | | | | |
|---|---|---|---|---|
| FR | 3008309 | A1 * | 1/2015 | ............. A61G 3/065 |
| JP | 51100525 | | 9/1976 | |
| JP | 2193757 | A | 7/1990 | |
| JP | 9286338 | A | 11/1997 | |
| JP | 5229442 | B2 | 7/2013 | |
| WO | WO-2019105709 | A1 * | 6/2019 | |

* cited by examiner

*Primary Examiner* — Paul N Dickson
*Assistant Examiner* — Matthew D Lee
(74) *Attorney, Agent, or Firm* — The Webb Law Firm

(57) ABSTRACT

A travel body includes a wheel drive source for driving a drive wheel, a support arm swingable relative to a travel body section and supporting the drive wheel and the wheel drive source, a swing support attached to the travel body section and supporting the swing fulcrum of the support arm, and an elastic unit. The swing support is detachably attached to the travel body section. The elastic unit includes an abutting section that abuts, from a second side in the swing direction, a target spot located away from the swing fulcrum of the support arm, and an elastic section that biases the abutting section abutting the support arm toward a first side in the swing direction.

9 Claims, 14 Drawing Sheets

TRANSPORT VEHICLE

CROSS-REFERENCE TO RELATED APPLICATION

This application claims priority to Japanese Patent Application No. 2021-081805 filed May 13, 2021, the disclosure of which is hereby incorporated by reference in its entirety.

BACKGROUND OF THE INVENTION

1. Field of the Invention

The present invention relates to a transport vehicle for transporting articles.

2. Description of the Related Art

U.S. Pat. No. 5,229,442 (Patent Document 1), for example, discloses a transport vehicle provided with wheels on a bottom section of a vehicle body. Hereinafter, reference signs shown in parentheses in the Description of the Related Art belong to Patent Document 1.

Patent Document 1 discloses a technology in which a drive unit (10) applies a propulsion force in the travel direction to a vehicle body (1). The drive unit (10) is constituted by a drive wheel (15), a drive motor (13) that drives the drive wheel (15), and a coil spring (16) that biases the drive wheel (15) toward the travel surface in such a manner as to ground the drive wheel (15). The drive wheel (15), the drive motor (13) and the coil spring (16) are integrally configured via a wheel attachment plate (11) and a truck assembly plate (10a). The drive unit (10) that includes these sections is assembled to a chassis (2) by coupling the truck assembly plate (10a) to the chassis (2). Accordingly, the entire drive unit (10) can be removed from the chassis (2), by removing the truck assembly plate (10a) from the chassis (2).

With the technology disclosed in Patent Document 1, the drive wheel (15), the drive motor (13) and the coil spring (16) are integrally constituted as elements of the drive unit (10), and thus removing these elements from the chassis (2) involves removing the entire drive unit (10) from the chassis (2) as mentioned above. In the case of wanting to then perform maintenance on the drive wheel (15), the drive motor (13) and the coil spring (16) separately, this will further necessitate disassembling the drive wheel (15), the drive motor (13) and the coil spring (16). Also, removing the compressed coil spring (16) at this time often takes time and effort. Thus, the technology disclosed in Patent Document 1 has room for improvement in terms of maintainability.

SUMMARY OF THE INVENTION

In view of the above circumstances, it is desirable to realize a transport vehicle capable of improving the maintainability of a drive wheel and a support mechanism of the drive wheel.

A transport vehicle for transporting an article, including:
a travel body configured to travel on a travel surface,
whereby the travel body includes a travel body section; a drive wheel; a wheel drive source configured to drive the drive wheel; a support arm swingable relative to the travel body section and supporting the drive wheel and the wheel drive source; a swing support attached to the travel body section and supporting a swing fulcrum of the support arm; and an elastic unit, the swing support is detachably attached to the travel body section, and
the elastic unit includes an abutting section configured to abut, from a second side in the swing direction, a target spot located away from the swing fulcrum of the support arm; and an elastic section configured to bias the abutting section abutting the support arm toward a first side in the swing direction,
the first side being a side on which the drive wheel is directed toward the travel surface in a swing direction of the support arm,
the second side being a side opposite to the first side.

With this configuration, due to the abutting section biased by the elastic section abutting the support arm with the drive wheel at least partially supporting the weight of the travel body, the drive wheel supported by the support arm is pushed toward the travel surface, enabling the drive wheel to be brought in contact with the travel surface. It is thereby unlikely that the drive wheel will lift up off the travel surface and spin idly. The abutting section only abuts the support arm as described above, and is not integrally coupled to the support arm. Thus, by removing the swing support supporting the swing fulcrum of the support arm from the travel body section, the support arm together with the drive wheel and wheel drive source supported thereby can be removed from the travel body section independently of the elastic unit including the abutting section and the elastic section. Accordingly, this configuration enables the support arm and the drive wheel and wheel drive source to be easily removed from the travel body section, with little chance of being affected by the elastic force of the elastic section. Accordingly, the maintainability of the drive wheel and the support mechanism of the drive wheel can be improved.

Other features and advantages of the technology related to the disclosure will become clear from the following description of illustrative and nonlimiting embodiments with reference to the drawings.

BRIEF DESCRIPTION OF THE DRAWINGS

FIG. 2 is a plan view showing regions that a travel body travels through.

DETAILED DESCRIPTION OF PREFERRED EMBODIMENTS

A transport vehicle is configured to transport articles. Hereinafter, embodiments of the transport vehicle will be described, taking as an example the case where the transport vehicle is provided in a transport facility that transporting containers. That is, in the present embodiment, the transport vehicle is configured to transport containers.

Figure 1:
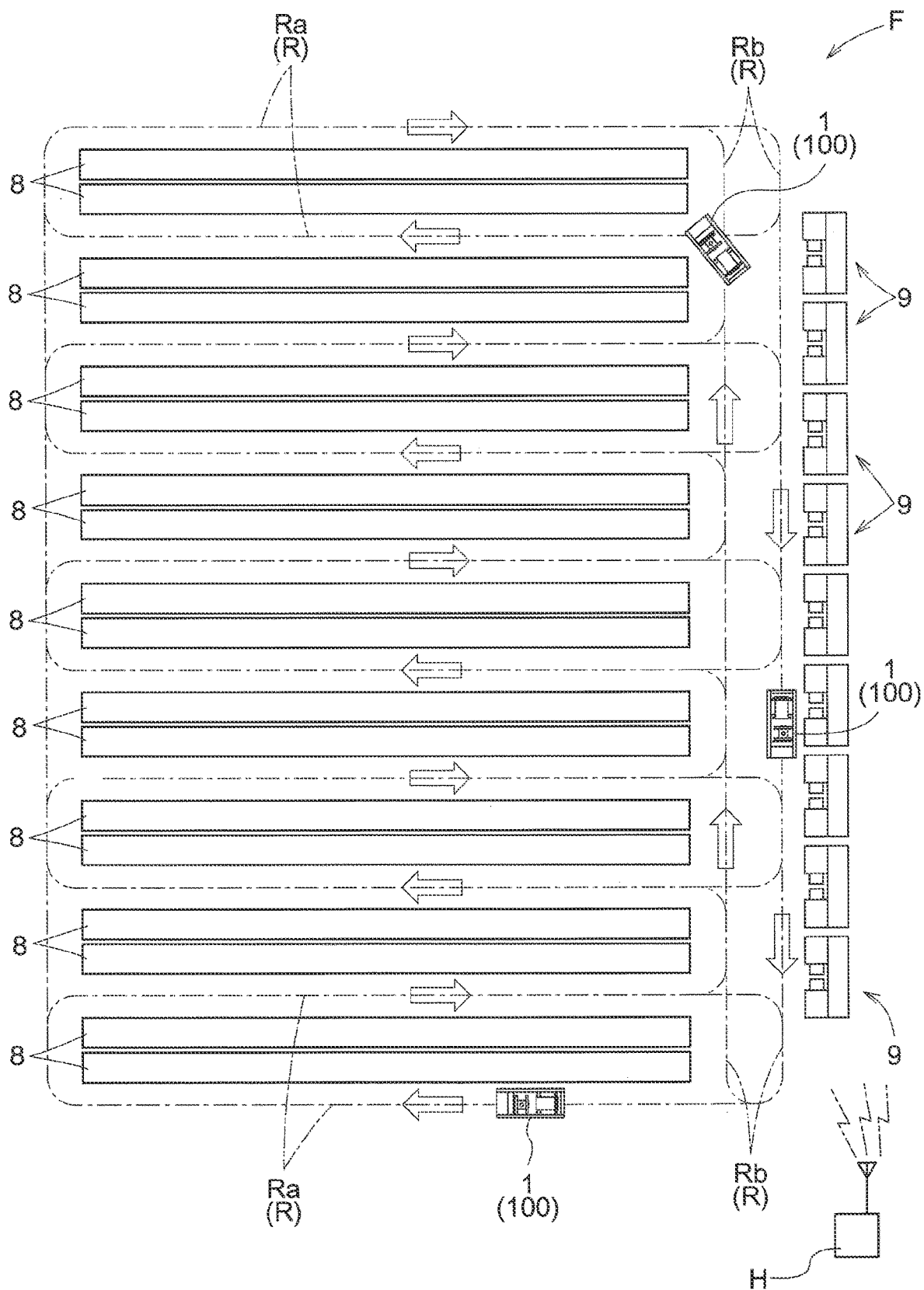
FIG. 1 is a plan view of a transport facility including a transport vehicle.

As shown in FIG. 1, a transport facility F includes a container rack 8 for storing containers 70 (see FIG. 3), a carry in/out section 9 for carrying containers 70 in and out, and a host controller H for managing the entire facility. A transport vehicle 100 transports containers 70 carried in by the carry in/out section 9 to the container rack 8, or transports containers 70 stored in the container rack 8 to the carry in/out section 9 for carrying out.

In the present embodiment, the transport facility F is provided with a plurality of container racks 8 disposed parallel to one another at a predetermined interval. Each of the container racks 8 is open at least at the front, and the containers 70 are taken in and out from the front of the container racks 8. Part of a travel path R of a travel body 1 (transport vehicle 100) is set between pairs of adjacent container racks 8 that face one another from the front. In other words, adjacent container racks 8 forming a pair are spaced apart parallel to one another, and part of the travel path R is set to pass between the pair of container racks 8. The outermost container racks 8 of the plurality of container racks 8 provided in the transport facility F face outward from the front, and part of the travel path R is also set in the region along the front of these outermost container racks 8. Furthermore, the transport facility F is provided with a plurality of carry in/out sections 9, and part of the travel path R is also set in the region passing by each of the carry in/out sections 9.

The travel path R includes an inner path Ra extending along the front of each container rack 8 in the extension direction of the container rack 8 and an outer path Rb set outside the region in the container racks 8 are disposed. The inner path Ra is set corresponding to each of the container racks 8. In the present embodiment, the parts of the travel path R set in the region between pairs of adjacent container racks 8 that face one another from the front and the parts of the travel path R set in the region along the front of the container racks 8 facing outward from the front correspond to the inner paths Ra. The outer paths Rb are set to link the inner paths Ra. The outer paths Rb are also set to pass by each of the carry in/out sections 9. In the present embodiment, the portion of the travel path R other than the inner paths Ra corresponds to the outer paths Rb.

Figure 2:
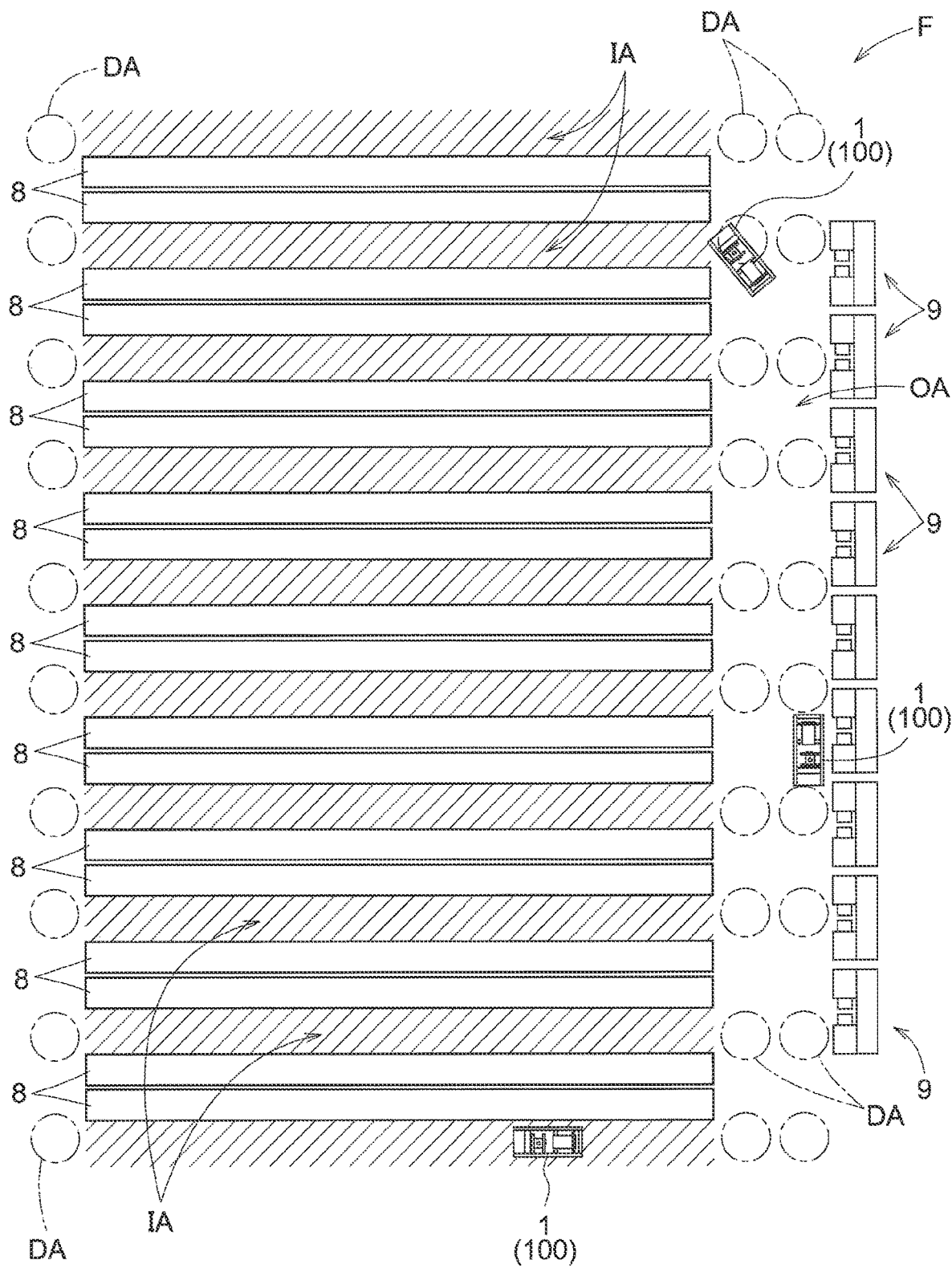

As shown in FIG. 2, a rack region IA and an external region OA in which the travel body 1 travels are set in the transport facility F. In the present embodiment, a direction change region DA is further set in the transport facility F.

The rack region IA is a region set along the front of each container rack 8. The entirety of the rack region IA opposes the front of the container rack 8 corresponding to that rack region IA. In other words, each rack region IA extends along the front of the container rack 8 corresponding to that rack region IA in the extension direction of the container rack 8. The dimensions of the rack region IA in the extension direction are equal to the dimensions of the container rack 8 in the extension direction.

Also, the rack region IA is the region through which the inner path Ra (see FIG. 1) passes, and the region where the travel body 1 traveling on the inner path Ra opposes the front of the container rack 8. In the present embodiment, the rack region IA is set in the region between pairs of adjacent container racks 8 that face one another from the front. The rack region IA is also set in the region along the front of the outermost container racks 8 of the plurality of container racks 8 provided in the transport facility F.

The external region OA is the region within the transport facility F other than the rack regions IA. The external region OA is the region through which the outer paths Rb pass. In the present embodiment, the direction change region DA is set at a plurality of locations in the external region OA. The direction change region DA is a region for the travel body 1 to change the movement direction (direction change). Some of the direction change regions DA are set in places where a plurality of travel paths R (outer paths Rb) intersect. While a detailed description will be given later, the travel body 1 according to the present embodiment changes the movement direction, by rotating at that spot around the axis extending vertically in the direction change region DA.

Container Rack

Figure 3:
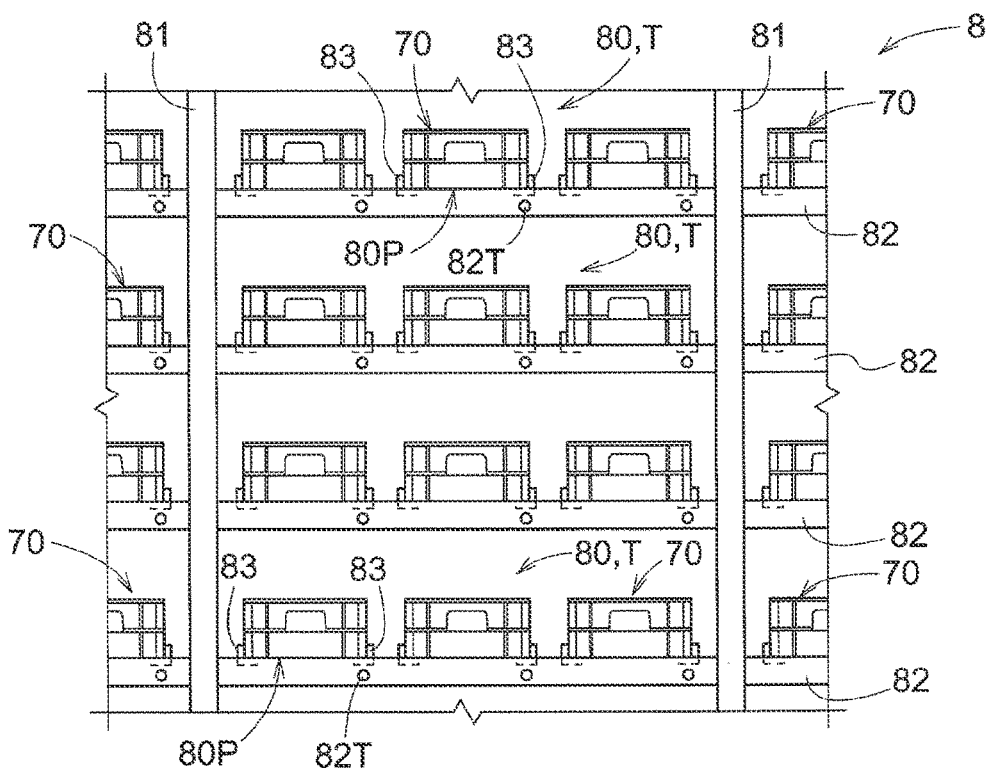
FIG. 3 is a front view of a container rack.

As shown in FIG. 3, the container rack 8 is provided vertically with a plurality of rack sections 80 for storing containers 70. In the present embodiment, the container rack 8 includes a plurality of beam members 82 extending horizontally along the front of the container racks 8, and a plurality of strut members 81 extending vertically and coupled to the beam members 82. That is, the container rack 8 includes a support frame combining the plurality of support members 81 and the plurality of beam members 82.

The beam members 82 are separated from one another vertically. A placement member 83 for placing a container 70 on is coupled to each of the beam members 82. In the present example, a container 70 is stored in the rack section 80, by being placed on a pair of placement members 83. Also, plural pairs of placement members 83 are disposed in the rack sections 80, and a plurality of containers 70 can be stored in one rack section 80. Note that, in the present example, the region between a pair of strut members 81 adjacent in the width direction (left-right direction) and between a pair of beam members 82 adjacent in the vertical direction in the front view shown in FIG. 3 corresponds to an opening of the container rack 8.

In the present embodiment, at a reference position 80P for storing a container 70 in the rack section 80, a target section 82T serving as a target for storing the container 70 at the reference position 80P is provided. In the present example, the target section 82T is provided to the beam member 82. The target section 82T is provided one for each pair of placement members 83. In the illustrated example, the target section 82T is a hole formed in the beam member 82.

Container

The container 70 is the object of transportation by the transport vehicle 100. Although not illustrated in detail, the container 70 is formed in a box shape having an open section that is open upwardly. In the present example, the outer shape of the container in top-down view forms a rectangular shape. A predetermined storage item can be stored inside the container 70. The storage item includes, for example, various products such as foodstuff or household items, or items such as components or in-process goods to be used on a factory production line or the like. As described above, in the present embodiment, the container 70 corresponds to an "article". That is, in the present embodiment, the article is the container 70 capable of storing items for storage.

In the present embodiment, the container 70 is stackable on another container 70 with the storage item stored therein. That is, the containers 70 are vertically stackable (see FIG. 4). In the present example, two containers 70 are vertically stackable, due to the bottom of one container 70 fitting into the open section of the other container 70 from above.

Transport Vehicle

Figure 4:
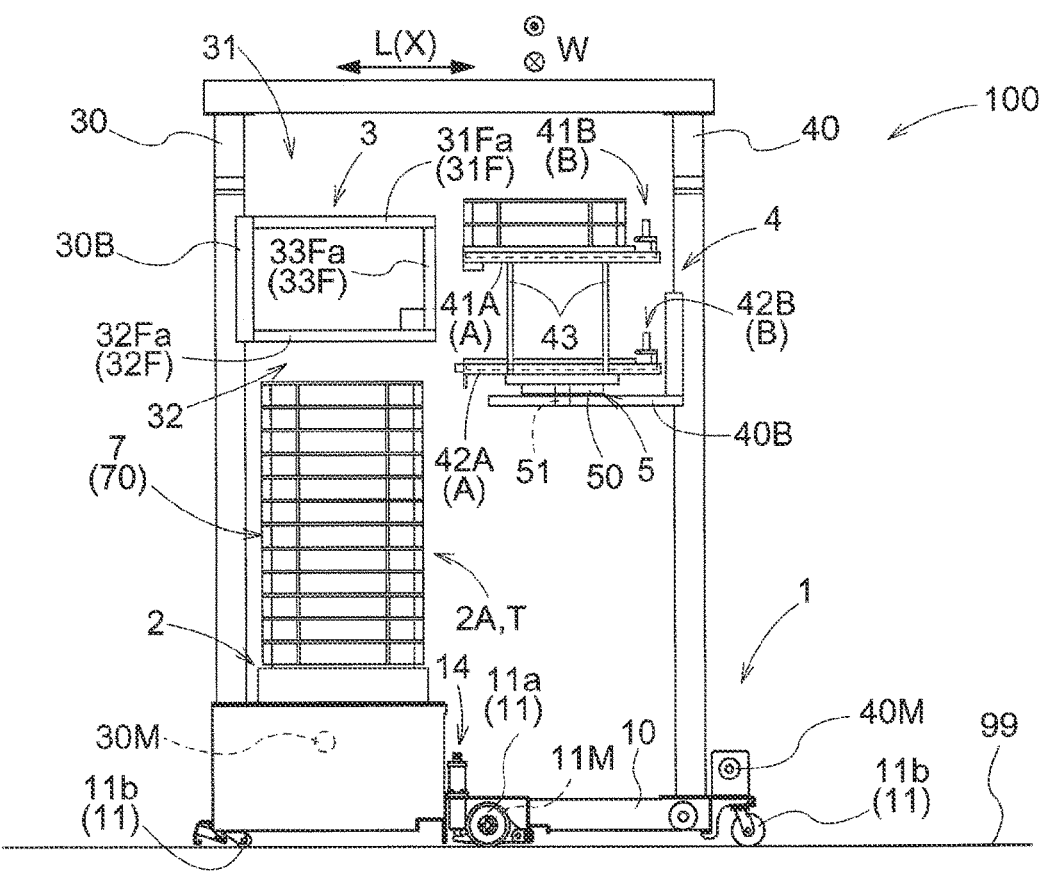
FIG. 4 is a view of the transport vehicle in a vehicle body width direction.

As shown in FIG. 4, the transport vehicle 100 includes the travel body 1 that travels on a travel surface 99. The travel body 1 travels along the predetermined travel path R (see FIG. 1). In the present embodiment, the transport vehicle 100 includes a container group support section 2 for supporting a plurality of containers 70 within a predetermined stacking region 2A as a stacked container group 7, a lifting device 3 for lifting the containers 70 of the container group 7 supported by the container group support section 2, and a transfer device 4 for transferring the containers 70. In the present embodiment, the transport vehicle 100 further includes a control device C (see FIG. 6) for controlling the travel body 1, the lifting device 3 and the transfer device 4. The control device C also additionally controls the container group support section 2.

The container group support section 2, the lifting device 3 and the transfer device 4 are mounted on the travel body 1. When the direction in which the travel body 1 travels is given as "vehicle body length direction L", the container group support section 2 and the transfer device 4 are disposed side by side in the vehicle body length direction L on the travel body 1. Note that, hereinafter, the direction orthogonal to the vehicle body length direction L in top-down view extending vertically is given as "vehicle body width direction W".

Travel Body

The travel body 1 is configured to travel on the predetermined travel path R (see FIG. 1), and is capable of traveling through the rack regions IA and the external region OA (see FIG. 2). In the present embodiment, the travel body 1 is configured to travel on the inner paths Ra and the outer path Rb. The travel body 1 is located in the rack region IA when traveling or stopped on the inner path Ra, and is located in the external region OA when traveling or stopped on the outer path Rb. When the travel body 1 is on the boundary between the rack region IA and the external region OA, part of the travel body 1 is located in the rack region IA, and the remaining part of the travel body 1 is located in the external region OA.

The travel body 1 includes a travel body section 10, a drive wheel 11a and a wheel drive source 11M for driving the drive wheel 11a. In the present embodiment, the travel body 1 further includes a driven wheel 11b. The drive wheel 11a and the driven wheel 11b constitute travel wheels 11 and are supported by the travel body section 10. A propulsion force is applied to the travel body 1, due to the wheel drive source 11M driving the drive wheel 11a. The structure of the travel body 1 will be described in detail later.

Container Group Support Section

The container group support section 2 is mounted on the travel body 1. The container group support section 2 is capable of supporting a plurality of containers 70 as a stacked container group 7. The stacking region 2A in which the container group 7 is disposed is predetermined upward of the container group support section 2. The stacking region 2A is a three-dimensional virtual region extending upwardly from the container group support section 2. In the present example, the container group support section 2 is a conveyor capable of moving a container group 7 with the container group 7 placed thereon. In the present example, the container group support section 2 is capable of moving the container group 7 in the vehicle body width direction W. The conveyor constituting the container group support section 2 may be a known conveyor such as a roller conveyor, a chain conveyor or a belt conveyor.

The carry in/out section 9 (see FIGS. 1 and 2) carries in a container group 7 in which a plurality of containers 70 are stacked. With the travel body 1 adjacent to the carry in/out section 9, the container group support section 2 receives a container group 7 from the carry in/out section 9 or delivers a container group 7 to the carry in/out section 9. That is, the container group support section 2 receives and delivers container groups 7 from and to the carry in/out section 9. Although not illustrated in detail, in the present example, the carry in/out section 9 is adjacent to a picking area where removal of storage items such as products from the containers 70 is performed. When a container group 7 is delivered from the container group support section 2 to the carry in/out section 9, the storage items are removed the containers 70 in the picking area adjacent to the carry in/out section 9. After some or all of the storage items stored in a container 70 are removed, the container 70 is delivered from the carry in/out section 9 to the container group support section 2 (transport vehicle 100) and transported to the container rack 8 again. The carry in/out section 9 need not, however, be adjacent to the picking area, and may be adjacent to another facility or work area. Also, the carry in/out section 9 may, for example, be configured to transport a container group 7 delivered from the container group support section 2 to outside the transport facility F.

Lifting Device

The lifting device 3 is mounted on the travel body 1. The lifting device 3 is configured to lift the containers 70 of the container group 7 supported by the container group support section 2, or in other words, the containers 70 of the container group 7 disposed in the stacking region 2A. Also, the lifting device 3 is capable of horizontally supporting the container group 7 disposed in the stacking region 2A.

The lifting device 3 includes a lifting mast 30 standing upwardly from the travel body 1, a lift elevating body 30B coupled to the lifting mast 30, and a lift elevating body drive section 30M for elevating the lift elevating body 30B up and down along the lifting mast 30. Although not illustrated in detail, the lift elevating body drive section 30M is a motor for rotationally driving a rotary body around which an endless body such as a belt is wound.

Figure 9:
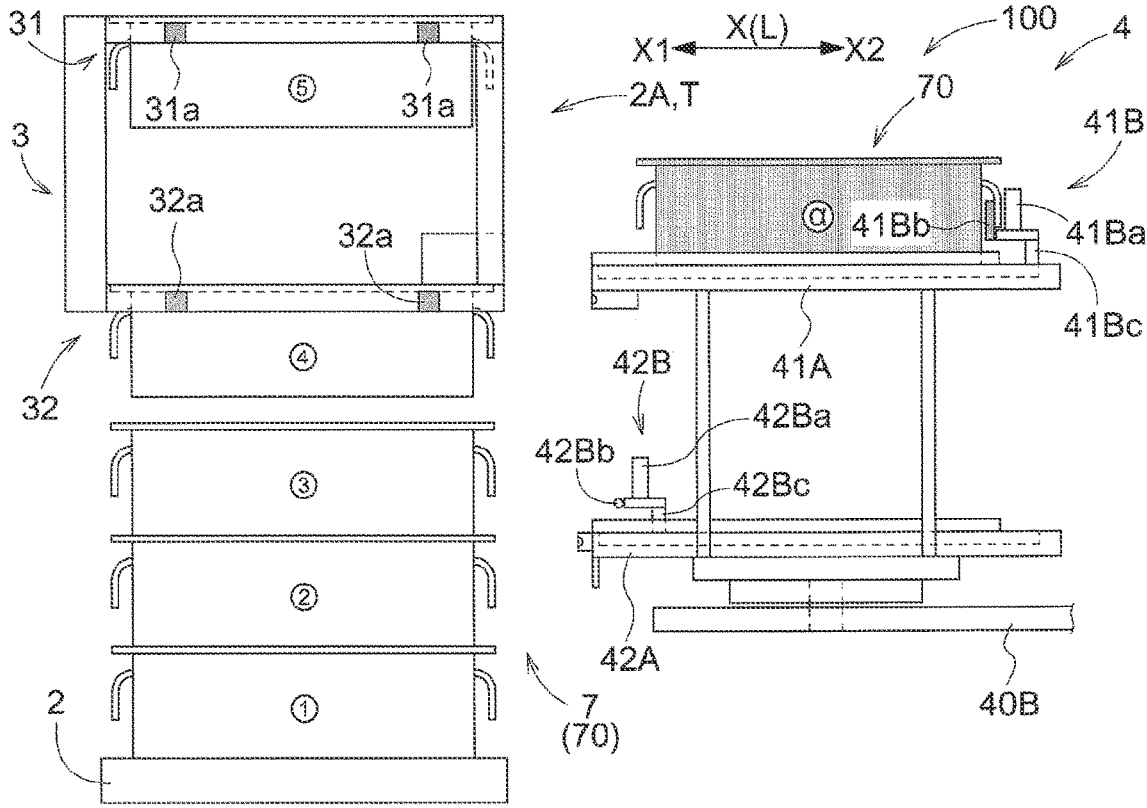
FIG. 9 is a diagram showing containers in a stacking area after having been lifted by a lifting device.

The lifting device 3 includes a first lifting mechanism 31 for lifting a container 70 at any height within the container group 7 stacked in the stacking region 2A up from the container 70 adjacent below the container 70 to be lifted, and a second lifting mechanism 32 for lifting a container 70 that is lower down than the container 70 lifted by the first lifting mechanism 31 up from the container 70 adjacent below the container 70 to be lifted. In the present embodiment, the first lifting mechanism 31 and the second lifting mechanism 32 are separated vertically. A space between the container 70 lifted by the first lifting mechanism 31 and the container 70 lifted by the second lifting mechanism 32 can thereby be formed vertically, as shown in FIG. 9, for example. A space can also be formed vertically downward of the container 70 lifted by the second lifting mechanism 32.

In the present embodiment, the lifting device 3 includes a first frame section 31F and a second frame section 32F that protrude in the vehicle body length direction L toward the stacking region 2A from the lift elevating body 30B, and a coupling frame section 33F coupling the first frame section 31F and the second frame section 32F. The first frame section 31F and the second frame section 32F are spaced apart from one another vertically. The first frame section 31F is higher than the second frame section 32F. The coupling frame section 33F couples the first frame section 31F and the second frame section 32F vertically. Such a configuration prevents relative movement of the first frame section 31F and the second frame section 32F, and maintains a constant interval vertically between the first frame section 31F and the second frame section 32F. The first frame section 31F, the second frame section 32F and the coupling frame section 33F are elevated up and down as one, following the lift elevating body 30B being elevated up and down.

Although not illustrated in detail, in the present embodiment, the first frame section 31F includes a pair of first frame members 31Fa spaced apart from one another in the vehicle body width direction W. The pair of first frame members 31Fa are disposed corresponding to the width (length in the vehicle body width direction VV) of the containers 70 disposed in the stacking region 2A. The second frame section 32F includes a pair of second frame members 32Fa spaced apart from one another in the vehicle body width direction W. The pair of second frame members 32Fa are disposed corresponding to the width of the containers 70 disposed in the stacking region 2A. The coupling frame section 33F includes a pair of coupling frame members 33Fa spaced apart from one another in the vehicle body width direction W. Each of the pair of coupling frame members 33Fa couples the first frame member 31Fa and the second frame member 32Fa that are aligned vertically.

As shown in FIG. 9, in the present embodiment, the first lifting mechanism 31 includes a first lifting holding section 31a for holding a container 70. The first lifting holding section 31a is capable of posture change between a holding posture for holding a container 70 and a non-holding posture for not holding a container 70. In FIG. 9, the first lifting holding section 31a is in the holding posture.

Similarly, the second lifting mechanism 32 includes a second lifting holding section 32a for holding a container 70. The second lifting holding section 32a is capable of posture change between a holding posture for holding a container 70 and a non-holding posture for not holding a container 70. In FIG. 9, the second lifting holding section 32a is in the holding posture.

Here, in FIG. 9, numbers 1 to 5 are given to the containers 70 stacked in the stacking region 2A in ascending order. Also, the container 70 held by the transfer device 4 is given the letter "a".

Figure 10:
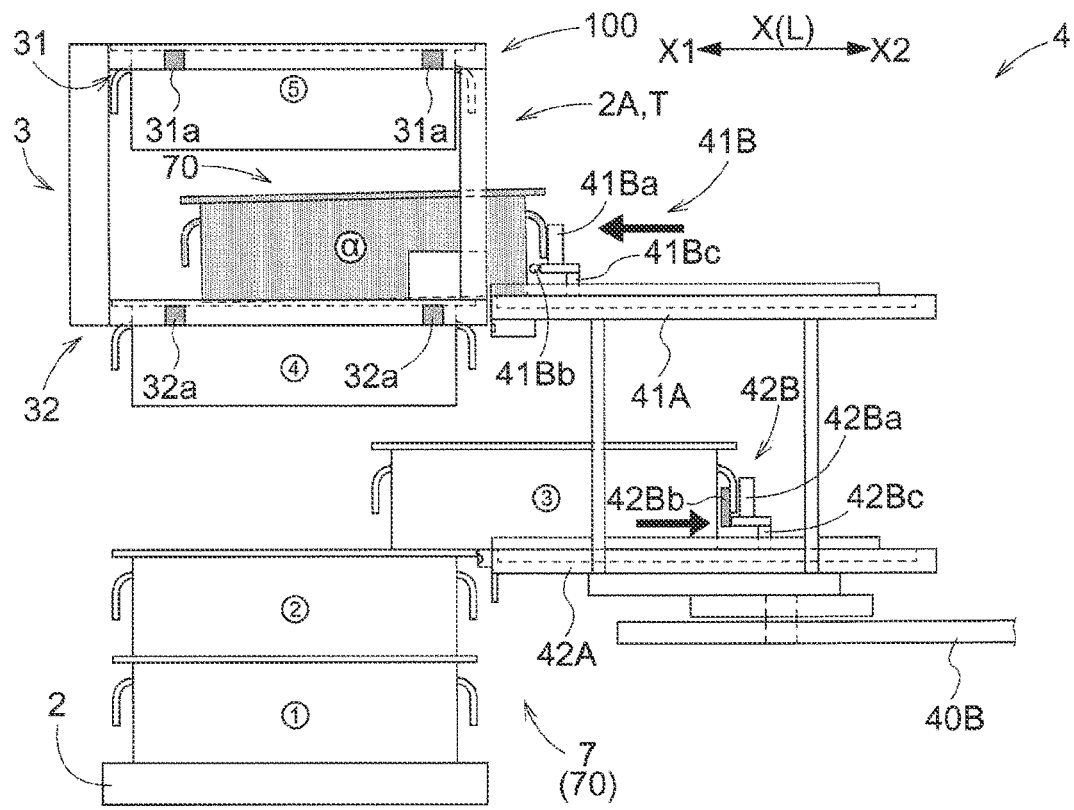
FIG. 10 is an illustrative view of performing parallel operations for loading and unloading containers with respect to the stacking area.

In the case where a space is formed vertically between the container 70 lifted by the first lifting mechanism 31 and the container 70 lifted by the second lifting mechanism 32, it is possible to unload another container 70 into this space. That is, another container 70 can be stacked on the container 70 lifted by the second lifting mechanism 32, with use of the transfer device 4. FIG. 10 shows an example of unloading a container 70 (container "a") held by the transfer device 4 into the space formed vertically between the container 70 (container "5") lifted by the first lifting mechanism 31 and the container 70 (container "4") lifted by the second lifting mechanism 32.

Also, in the case where a space is formed vertically downward of the container 70 lifted by the second lifting mechanism 32, this space can be utilized to load the container 70 disposed below the container 70 lifted by the second lifting mechanism 32. FIG. 10 shows an example of loading the container 70 (container "3") disposed below the container 70 (container "4") lifted by the second lifting mechanism 32. Note that the operations for unloading and loading containers 70 with respect to the stacking region 2A will be described later.

Transfer Device

As shown in FIG. 4, the transfer device 4 is mounted on the travel body 1. The transfer device 4 transfers containers 70 with respect to a transfer target location T. The transfer device 4 performs an unloading operation for transferring a container 70 to the transfer target location T and a loading operation for transferring a container 70 from the transfer target location T. In the present embodiment, the transfer target location T includes the stacking region 2A and the rack section 80 of the container rack 8.

Here, the movement direction of a container 70 that is transferred by the transfer device 4 is given as "transfer direction X". Also, one side in the transfer direction X is given as "transfer direction unloading side X1", and the other side is given as "transfer direction loading side X2". In the present example, the transfer direction X is a direction extending horizontally. The transfer direction unloading side X1 is, in the case of unloading a container 70, the side to which the container 70 moves in the transfer direction X. The transfer direction loading side X2 is, in the case of loading a container 70, the side to which the container 70 moves in the transfer direction X.

Figure 5:
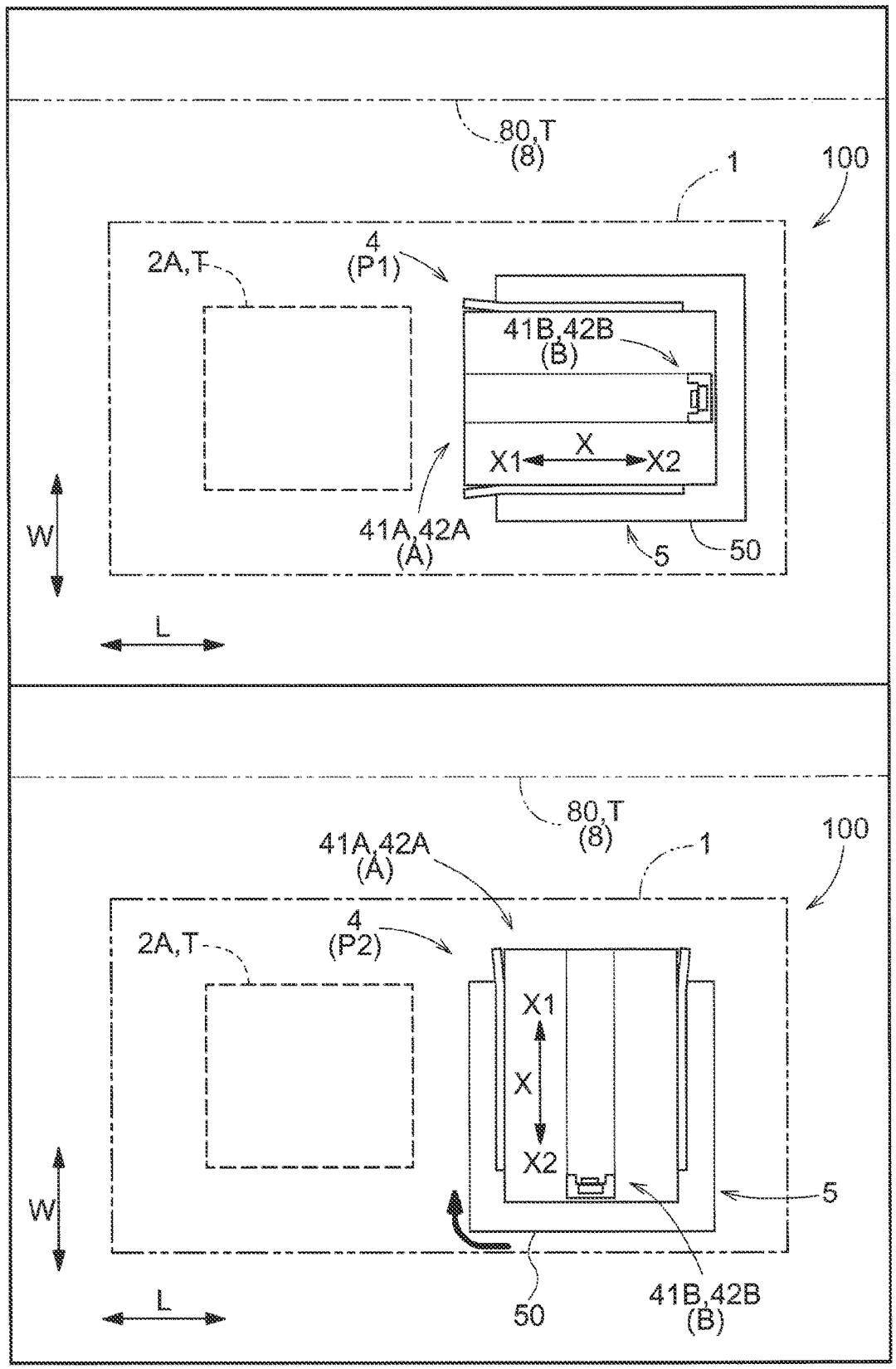
FIG. 5 is a plan view showing a first posture and a second posture of a transfer device.

In the present embodiment, the transport vehicle 100 includes a turning device 5 that turns the transfer device 4 around an axis extending vertically. As shown in FIG. 5, the turning device 5 turns the transfer device 4 (specifically, part of the transfer device 4) around an axis extending vertically, and changes the orientation of the transfer device 4 between a first posture P1 in which the transfer direction unloading side X1 faces the stacking region 2A and a second posture P2 in which the transfer direction unloading side X1 faces the container rack 8. In the present embodiment, the turning device 5 is thus able to change the transfer direction X in a horizontal plane.

In the present embodiment, the transfer device 4 changes the posture according to the position of the transfer target location T. Specifically, the transfer device 4 will be the first posture P1 if the transfer target location T is the stacking region 2A, and will be in the second posture P2 if the transfer target location T is the container rack 8 (rack section 80). As shown in FIG. 4, in the present example, the turning device 5 includes a turning base 50 that supports the transfer device 4 (specifically, part of the transfer device 4), a turning shaft 51 that supports the turning base 50 to be turnable with respect to the transfer elevating body 40B, and a turning drive section (not shown) that drives the turning shaft 51.

As shown in FIG. 4, the transfer device 4 includes a transfer mast 40 that is fixed to the travel body 1 and disposed vertically, a transfer elevating body 40B that elevates up and down along the transfer mast 40, a holding section A that is coupled to the transfer elevating body 40B and holds the container 70, and a transfer machine B for transferring the container 70. Also, the transfer device 4 includes a transfer elevating body drive section 40M for elevating the transfer elevating body 40B up and down along the transfer mast 40. The transfer device 4 is thereby able to move the holding section A and the transfer machine B vertically, and it is possible to transfer containers 70 to each of the rack sections 80 (see FIG. 3). Although not illustrated in detail, the transfer elevating body drive section 40M is a motor for rotationally driving a rotary body around which an endless body such as a belt is wound.

The holding section A is coupled to the transfer elevating body 40B, and is capable of holding a container 70. In the present embodiment, the holding section A includes a first holding section 41A and a second holding section 42A disposed lower down than the first holding section 41A. The first holding section 41A and the second holding section 42A are each capable of holding a container 70 independently.

In the present embodiment, the transfer device 4 includes a hold coupling section 43 that couples the first holding section 41A and the second holding section 42A vertically. The hold coupling section 43 couples the first holding section 41A and the second holding section 42A such that the vertical interval therebetween is constant.

The transfer machine B is capable transferring containers 70 with respect to the rack section 80 and the stacking region 2A. In the case where the rack section 80 is the transfer target location T, the transfer machine B transfers a container 70 between the holding section A and the rack section 80. Also, in the case where the stacking region 2A is the transfer target location T, the transfer machine B transfers the container 70 between the holding section A and the stacking region 2A. In the present example, the transfer machine B transfers a container 70 to the stacking region 2A in the first posture P1, and transfers a container 70 to the rack section 80 in the second posture P2 (see FIG. 5).

As shown in FIG. 4, in the present embodiment, the transfer machine B includes a first transfer machine 41B and a second transfer machine 42B disposed lower down than the first transfer machine 41B. The first transfer machine 41B transfers a container 70 between the first holding section 41A and the transfer target location T. The second transfer machine 42B transfers a container 70 between the second holding section 42A and the transfer target location T.

Control Configuration

Figure 6:
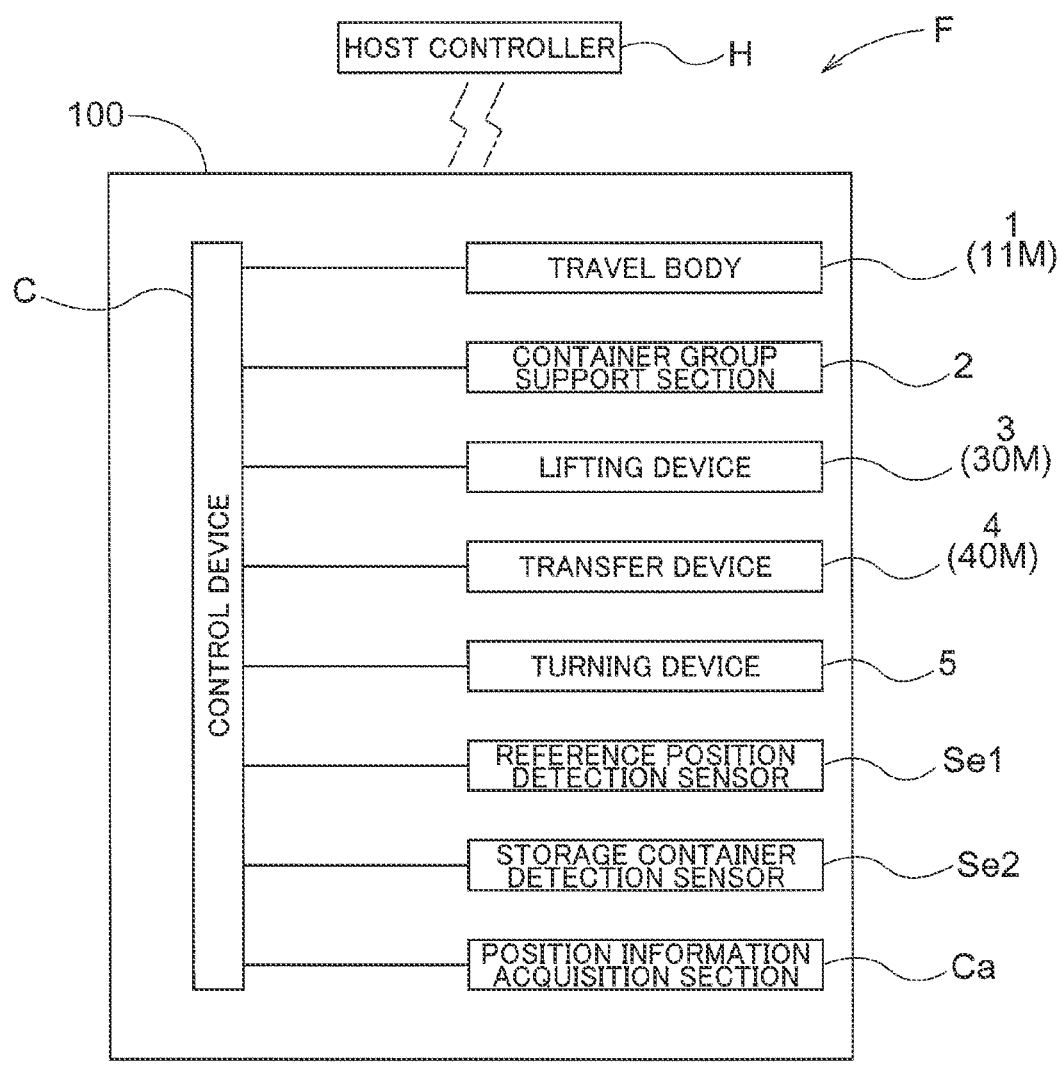
FIG. 6 is a control block diagram.

As shown in FIG. 6, the transport vehicle 100 includes the control device C that controls various sections. In the present embodiment, the control device C controls the travel body 1, the container group support section 2, the lifting device 3, the transfer device 4 and the turning device 5. Operations for supporting, transporting and transferring the containers 70 are realized through control of various sections by the control device C. In the present example, the control device C causes various sections to perform operations for supporting, transporting, and transferring the containers 70, based on detection results of a reference position detection sensor Se1 and a storage container detection sensor Se2 described later. The control device C includes a processor such as a microcomputer, a peripheral circuit such as a memory, and the like, for example. Various functions are realized through cooperation between the above hardware and programs that are executed on a processor such as a computer.

Transfer Operation

FIGS. 7 to 11 are illustrative views of the transfer device 4 performing a transfer operation (unloading operation or loading operation) of a container 70 with respect to the transfer target location T.

As shown in FIGS. 7 to 11, in the present embodiment, the first transfer machine 41B includes a first pushing section 41Ba that, in the case of performing the unloading operation of a container 70, pushes the container 70 toward the transfer direction unloading side X1, a first latching section 41Bb that, in the case of performing the loading operation of a container 70, latched onto the container 70 and pulls the container 70 toward the transfer direction loading side X2, and a first support member 41Bc that supports the first pushing section 41Ba and the first latching section 41Bb. In the present example, the first support member 41Bc is driven by a drive section not shown, and moves in the transfer direction X relative to the first holding section 41A. The first pushing section 41Ba and the first latching section 41Bb are thereby movable in the transfer direction X relative to the first holding section 41A. The first pushing section 41Ba pushes the container 70 to be unloaded toward the transfer direction unloading side X1, by moving toward the transfer direction unloading side X1 relative to the first holding section 41A. Also, the first latching section 41Bb pulls the container 70 to be loaded toward the transfer direction loading side X2, by moving toward the transfer direction loading side X2 relative to the first holding section 41A.

Also, in the present embodiment, the second transfer machine 42B includes a second pushing section 42Ba that, in the case of performing the unloading operation of a container 70, pushes the container 70 toward the transfer direction unloading side X1, a second latching section 42Bb that, in the case of performing the loading operation of a container 70, latches onto the container 70 and pulls the container 70 toward the transfer direction loading side X2, and a second support member 42Bc that supports the second pushing section 42Ba and the second latching section 42Bb.

In the present example, the second support member 42Bc is driven by a drive section not shown, and moves in the transfer direction X relative to the second holding section 42A. The second pushing section 42Ba and the second latching section 42Bb are thereby movable in the transfer direction X relative to the second holding section 42A. The second pushing section 42Ba pushes the container 70 to be unloaded toward the transfer direction unloading side X1, by moving toward the transfer direction unloading side X1 relative to the second holding section 42A. Also, the second latching section 42Bb pulls the container 70 toward the transfer direction loading side X2, by moving toward the transfer direction loading side X2 relative to the second holding section 42A.

In the present embodiment, the first latching section 41Bb and the second latching section 42Bb are each driven by a drive section not shown, and are capable of posture change between a latching posture for latching onto a container 70 and a non-latching posture for not latching onto a container 70. In FIGS. 7 to 11, the first latching section 41Bb or second latching section 42Bb in the latching posture is shown in gray, and the first latching section 41Bb or second latching section 42Bb in the non-latching posture is shown in white.

Figure 7:
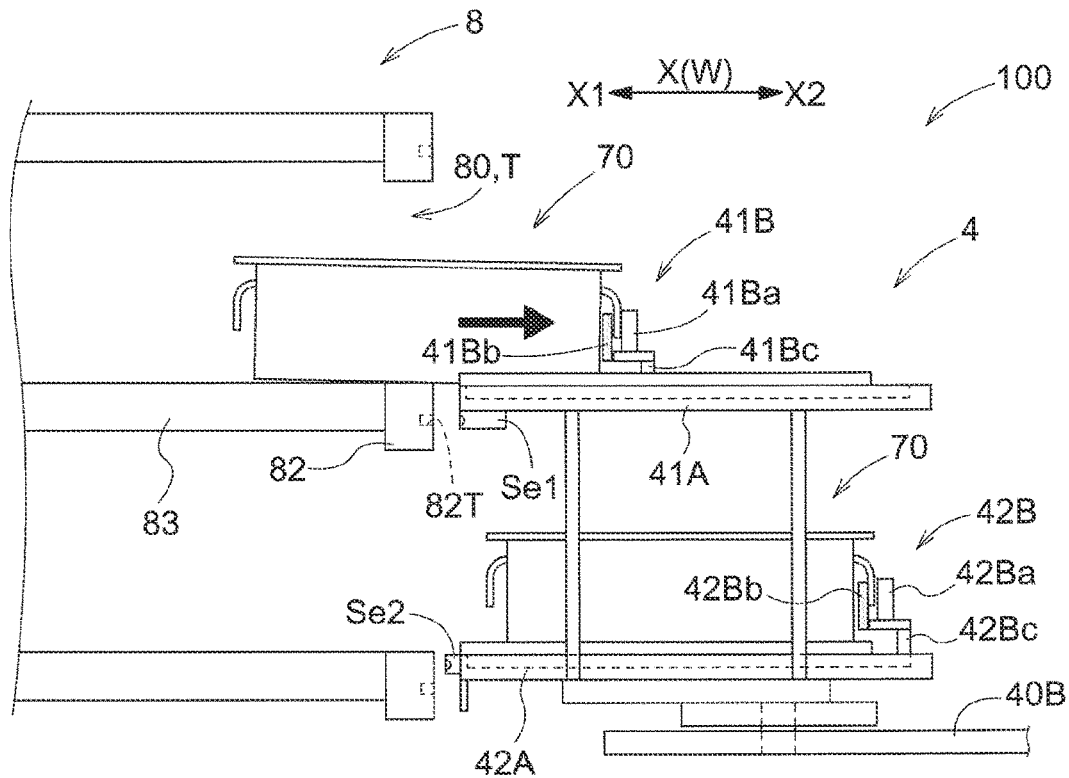
FIG. 7 is an illustrative view showing an operation for loading a container from a rack section.

FIG. 7 shows a loading operation (transfer operation) of a container 70 with respect to the rack section 80, and illustrates the case where the first transfer machine 41B loads a container 70 stored in the rack section 80 to the first holding section 41A. In this case, the control device C (see FIG. 6) aligns the position of the first transfer machine 41B with the reference position 80P (see FIG. 3) of the rack section 80, and then pulls the container 70 toward the transfer direction loading side X2 with the first latching section 41Bb.

In the present embodiment, the transfer device 4 includes the reference position detection sensor Se1 that detects the reference position 80P (see FIG. 3) of the rack section 80. As described above, the reference position 80P is a position serving as a reference for storing a container 70 in the rack section 80.

The reference position detection sensor Se1 detects the positional relationship between the transfer device 4 including the reference position detection sensor Se1 and the reference position 80P of the rack section 80, by detecting the target section 82T provided in the beam member 82. Transfer of a container 70 with respect to the rack section 80 can then be appropriately performed, by controlling the travel body 1, the turning device 5 and the transfer elevating body drive section 40M, based on the result of detecting the target unit 82T by the reference position detection sensor Se1, to perform an operation for correcting the position of the transfer device 4. In the present example, the reference position detection sensor Se1 is constituted by a camera. The positional relationship between the transfer device 4 and the target section 82T provided in the beam member 82 can be detected, through image recognition on images taken by the reference position detection sensor Se1 constituted as a camera. For example, the reference position detection sensor Se1 may have a function as a ranging sensor for detecting the distance to the target.

Figure 8:
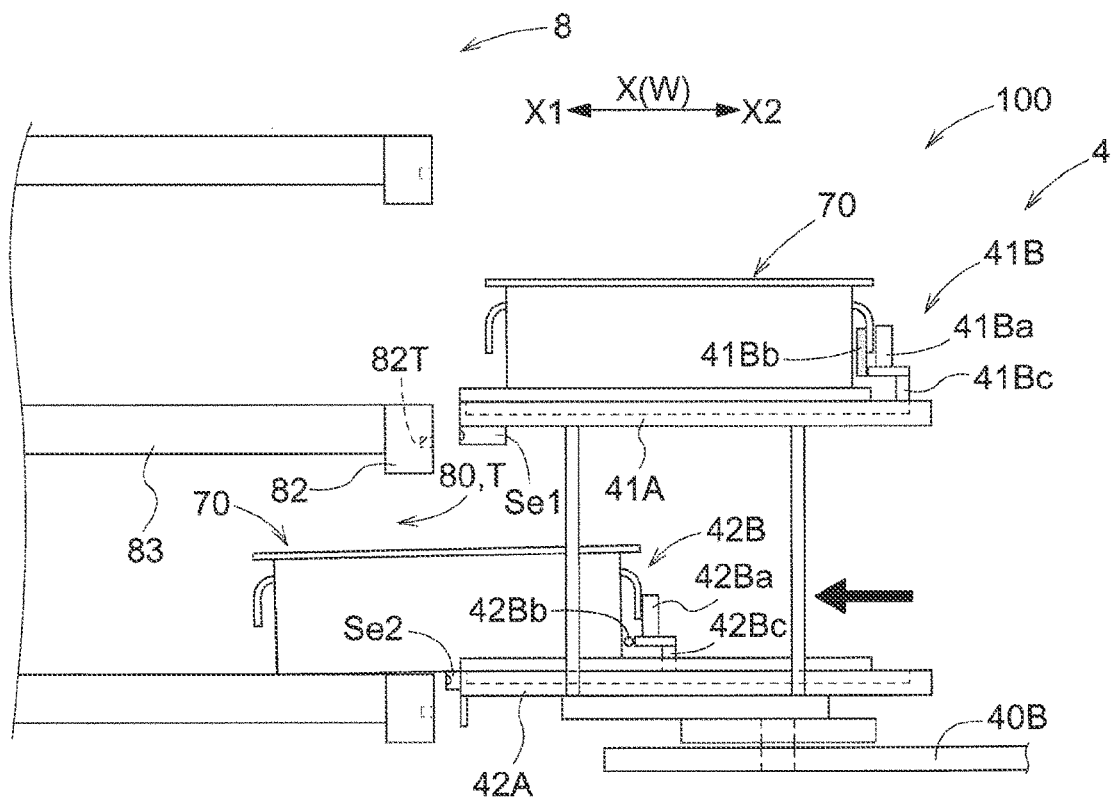
FIG. 8 is an illustrative view showing an operation for unloading a container onto a rack section.

FIG. 8 shows the unloading operation (transfer operation) of a container 70 with respect to the rack section 80, and illustrates the case where the second transfer machine 42B unloads a container 70 held in the second holding section 42A to the rack section 80. In this case, if it is determined that another container 70 is not stored in the rack section 80 to which the container 70 is to be unloaded, the control device C (see FIG. 6) pushes the container 70 toward the transfer direction unloading side X1 with the second pushing section 42Ba.

In the present embodiment, the transfer device 4 includes the storage container detection sensor Se2 that detects a container 70 stored in the rack section 80.

In the case of the transfer device 4 performing the unloading operation for transferring a container 70 to a rack section 80, the storage container detection sensor Se2 detects the presence or absence of a container 70 in the rack section 80 to be transferred to. If the storage container detection sensor Se2 detects that there is no container 70 in the rack section 80 to be unloaded to, the transfer device 4 performs the operation for unloading the container 70 to the rack section 80. If the storage container detection sensor Se2 detects that there is a container 70 in the rack section 80 to be unloaded to, the transfer device 4 may transfer the container 70 to another rack section 80 that is empty, or may stop the transfer. For example, the storage container detection sensor Se2 may be a ranging sensor for detecting the distance to the target. The transfer operation can thereby be performed while measuring the distance between the transfer device 4 and the transfer target location T. In the present embodiment, the storage container detection sensor Se2 is an optical sensor that projects light onto the target. The present invention is, however, not limited to such a configuration, and the storage container detection sensor Se2 may be constituted with use of known means such as an ultrasonic sensor or a camera, for example.

Figure 11:
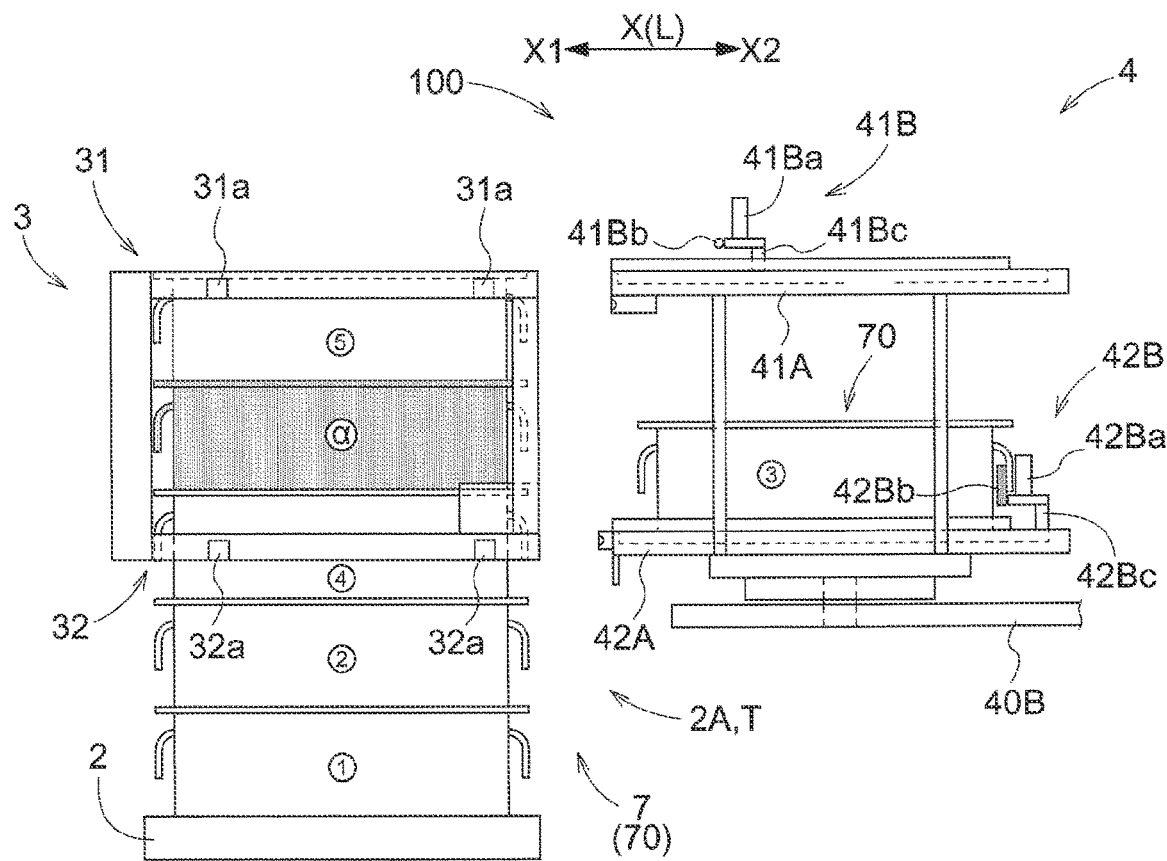
FIG. 11 is an illustrative view of performing parallel operations for loading and unloading containers with respect to the stacking area.

FIGS. 9 to 11 show the transfer operation of containers 70 with respect to the stacking region 2A. As described above, in the present embodiment, vertical spaces can be formed between a plurality of containers 70 stacked in the stacking region 2A, by the lifting device 3. The transfer device 4 then utilizes these spaces to transfer containers 70 with respect to the stacking region 2A. In the present embodiment, the transfer device 4 performs a loading operation and an unloading operation of containers 70 with respect to the stacking region 2A. Specifically, the transfer device 4 performs parallel operations for performing loading and unloading of containers 70 in parallel with respect to the stacking region 2A.

FIGS. 9 to 11 show an example in which five containers 70 are stacked as the container group 7 in the stacking region 2A. In these diagrams, the stacked containers 70 are numbered "1 to 5" in ascending order. Also, the letter "a" is given to the container 70 to be unloaded held by the first holding section 41A. In the example shown below, the container 70 (container "a") to be unloaded is unloaded onto the fourth container 70 (container "4"), utilizing the space formed vertically between the fifth container 70 (container "5") and the fourth container 70 (container "4") by the lifting device 3. Also, in parallel therewith, the third container 70 (container "3") is loaded, utilizing the space formed downward of the fourth container 70 (container "4") by the lifting device 3.

As shown in FIG. 10, the control device C (see FIG. 6) moves the second latching section 42Bb in the latching posture to the transfer direction loading side X2 relative to the second holding section 42A with the second latching section 42Bb latched onto the third container 70 (container "3"). In parallel therewith, the control device C moves the first pushing section 41Ba to the transfer direction unloading side X1 relative to the first holding section 41A, with the container 70 (container "a") held by the first holding section 41A being pushed by the first pushing section 41Ba. The second latching section 42Bb thereby pulls the container 70 (container "3") to be loaded to the transfer direction loading side X2, and the first pushing section 41Ba pushes the container 70 (container "a") to be unloaded to the transfer direction unloading side X1.

The control device C then disposes the container 70 (container "3") to be loaded that is pulled by the second latching section 42Bb on the second holding section 42A, and disposes the container 70 (container "a") to be unloaded that is pressed by the first pushing section 41Ba upward of the container 70 (container "4") lifted by the second lifting holding section 32a in such a manner as to fit onto the lifted container 70 (container "4"). The container group 7 in the stacking region 2A will thereby be a state such as shown in FIG. 11. That is, one (container "3") of the containers 70 disposed in the stacking region 2A is replaced with a new container 70 (container "a").

Configuration of Travel Body

Hereinafter, the configuration of the travel body 1 will be described, with reference to FIGS. 12 and 13.

Figure 12:
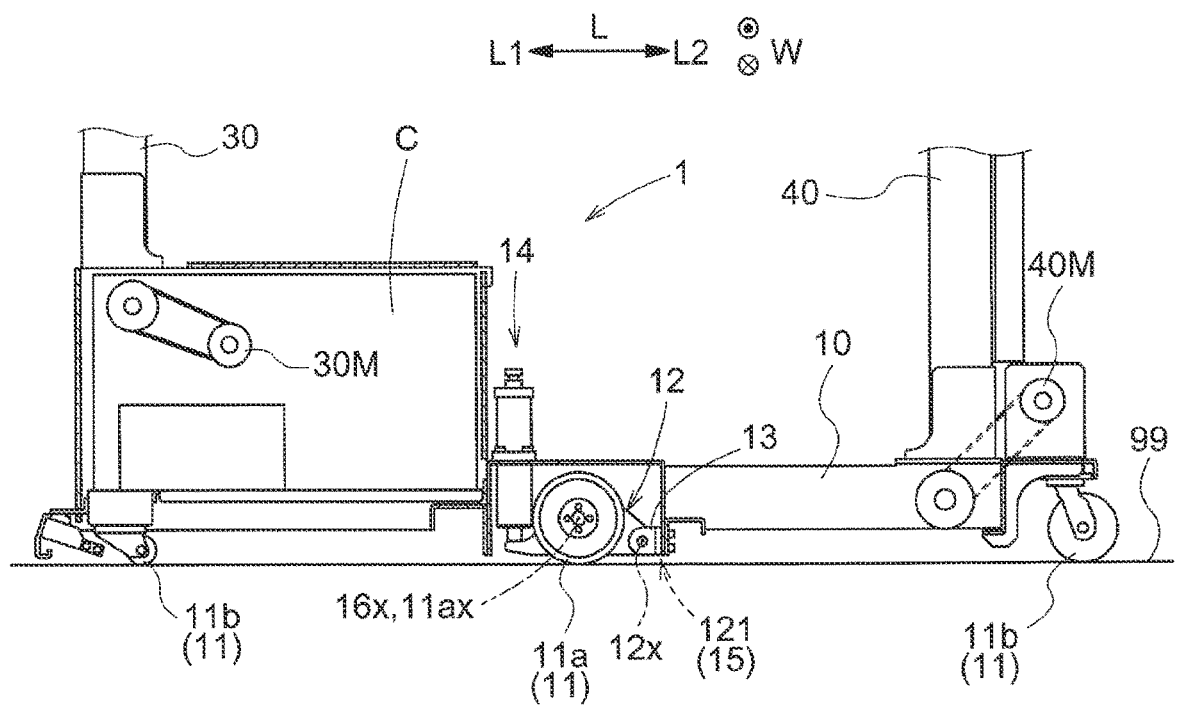
FIG. 12 is a view showing a main section of the travel body in the vehicle body width direction.
Figure 13:
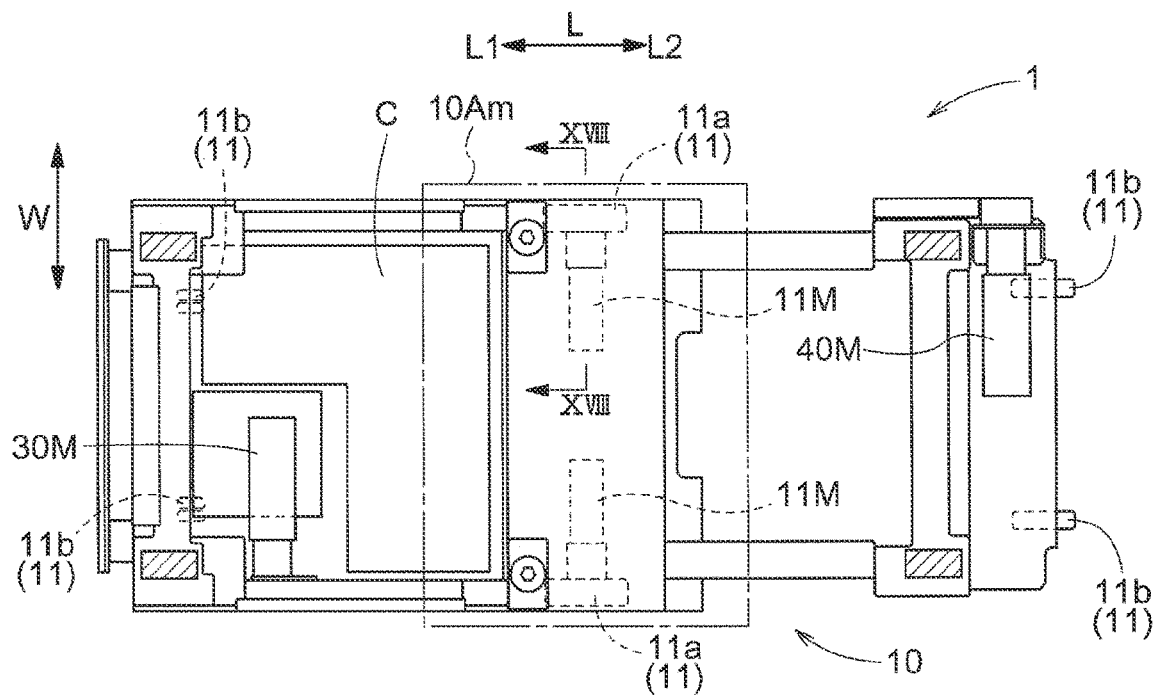
FIG. 13 is a plan view showing the main section of the travel body.

As shown in FIGS. 12 and 13, the travel body 1 includes the travel body section 10 and a plurality of travel wheels 11 supported by the travel body section 10. The travel wheels 11 include a pair of drive wheels 11a and a plurality of driven wheels 11b. The pair of drive wheels 11a are driven by the wheel drive source 11M.

The pair of drive wheels 11a are rotationally driven at the same speed or at different speeds to one another by the wheel drive source 11M. In the present embodiment, the pair of drive wheels 11a are independently driven by different wheel drive sources 11M. Note that the case where the pair of drive wheels 11a are rotationally driven at different speeds to one another includes the case where one of the pair of drive wheels 11a is rotationally driven in the forward direction, and the other drive wheel 11a is rotationally driven in the reverse direction. In other words, the pair of drive wheels 11a may be rotationally driven in opposite directions to one another.

In the present embodiment, the driven wheels 11b are provided on both sides in the vehicle body length direction L with respect to the pair of drive wheels 11a. That is, in the present example, four driven wheels 11b are supported by the travel body section 10. Each driven wheel 11b is supported by the travel body section 10 to be rotatable around an axis extending vertically. That is, the direction in which the rotation axis of the driven wheel 11b extends can be changed in a horizontal plane. In the present example, the driven wheels 11b are casters.

In the present embodiment, the transport vehicle 100 is able to perform a so-called spin turn in which the travel body 1 is turned at that spot around a vertical axis, due to the pair of drive wheels 11a being rotationally driven in opposite directions to one another. In the present example, the transport vehicle 100 changes the movement direction of the travel body 1, by performing a spin turn in the direction change region DA (see FIG. 1). Changing the movement direction of the travel body 1 is, however, also possible by means other than a spin turn. For example, the transport vehicle 100 may change the movement direction of the travel body 1, by stopping rotation of one of the pair of drive wheel 11a and rotating the other drive wheel 11a, or by rotating the pair of drive wheels 11a in the same direction but at different speeds.

Lower Center-of-Gravity Control

Figure 14:
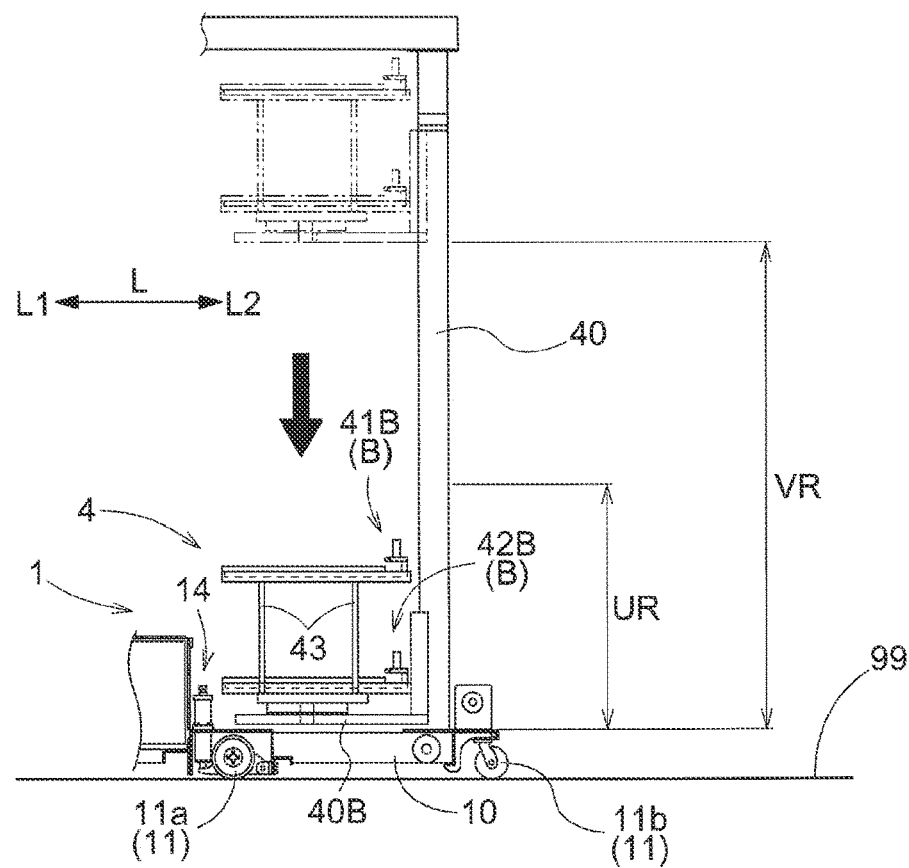
FIG. 14 is an illustrative view showing operations of the transfer device in center-of-gravity reduction control.

As shown in FIG. 14, in the present embodiment, the control device C (see FIG. 6) is capable of executing center-of-gravity reduction control for controlling the position of the transfer elevating body 40B to be located within a lower range UR set lower down than the middle of an elevatable range VR. The control device C executes center-of-gravity reduction control by controlling the transfer device 4. Specifically, the control device C executes center-of-gravity reduction control by controlling the transfer elevating body drive section 40M (see FIG. 12, etc.). By executing this center-of-gravity reduction control, the center of gravity of the entire transport vehicle 100 is lowered, making it unlikely that the transport vehicle 100 will tip over. The behavior of the transport vehicle 100 during turning including spin turns also tends to be stabilized. In the present embodiment, the control device C, in the center-of-gravity reduction control, positions the transfer elevating body 40B at the lowermost end of the elevatable range VR. The transport vehicle 100 is thereby made even less likely to tip over, and the behavior of the transport vehicle 100 during turning also tends to be further stabilized.

The control device C determines whether the travel body 1 is in the rack region IA or in the external region OA (see FIG. 2), and executes center-of-gravity reduction control in at least part of the external region OA. In the external region OA, there are few structures such as the container racks 8 that can serve as support for the transport vehicle 100 when the travel body 1 is in the rack region IA. However, as described above, due to center-of-gravity reduction control being executed in at least part of the external region OA, the center of gravity of the entire transport vehicle 100 can be lowered when the transport vehicle 100 is in the external region OA, thus making it unlikely that the transport vehicle 100 will tip over in the external region OA. Also, as described above, the external region OA is provided with direction change regions DA, which are regions for the travel body 1 to change the movement direction. Thus, direction change can be performed by spin turn or the like in the direction change regions DA, with the center of gravity of the transport vehicle 100 lowered.

In the present embodiment, the transport vehicle 100 includes a position information acquisition section Ca (see FIG. 6) that acquires current position information of the travel body 1. In the present example, the control device C determines whether the travel body 1 is in the rack region IA or is in the external region OA, based on the position information acquired by the position information acquisition section Ca. In the present example, the position information acquisition section Ca acquires current position information of the travel body 1 that is transmitted from the host controller H that manages the entire facility. In this case, the host controller H grasps the positions of travel bodies 1 (transport vehicles 100) that are present in the facility as a whole, and transmits current position information of the travel bodies 1 (transport vehicles 100) to the position information acquisition section Ca.

Figure 15:
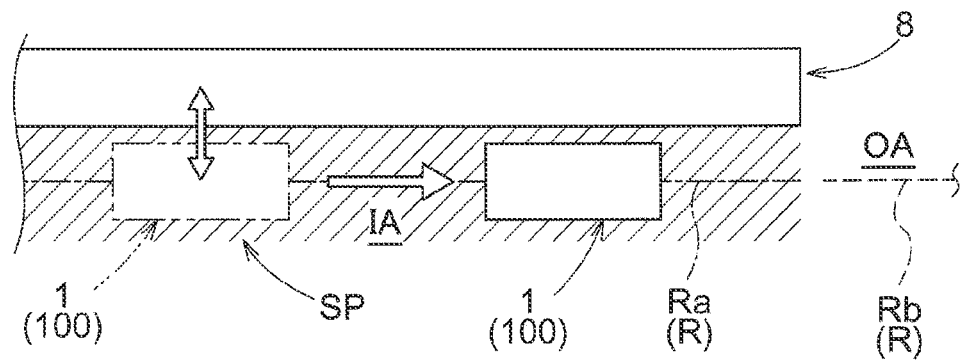
FIG. 15 is an illustrative view showing the timing for starting center-of-gravity reduction control.

As shown in FIG. 15, in the present embodiment, the position where the travel body 1 stops when the transfer device 4 (see FIG. 4, etc.) transfers containers 70 to and from the container rack 8 is given as a transfer stop position SP, and, after completing the transfer of containers 70 at the last transfer stop position SP before entering the external region OA from the rack region IA along the travel path R of the travel body 1, the control device C starts center-of-gravity reduction control before the travel body 1 enters the external region OA. The control device C then keeps executing the center-of-gravity reduction control while the travel body 1 is in the external region OA. In the present example, in the case of the transfer device 4 performing the next transfer of containers 70, the control device C keeps executing the center-of-gravity reduction control after the travel body 1 has entered the external region OA for the duration that the travel body 1 is in the external region OA, and until the next transfer is executed after the travel body 1 enters the rack region IA.

Next, the processing procedure in the case of executing the center-of-gravity reduction control will be described, with reference to the flowchart in FIG. 16.

Figure 16:
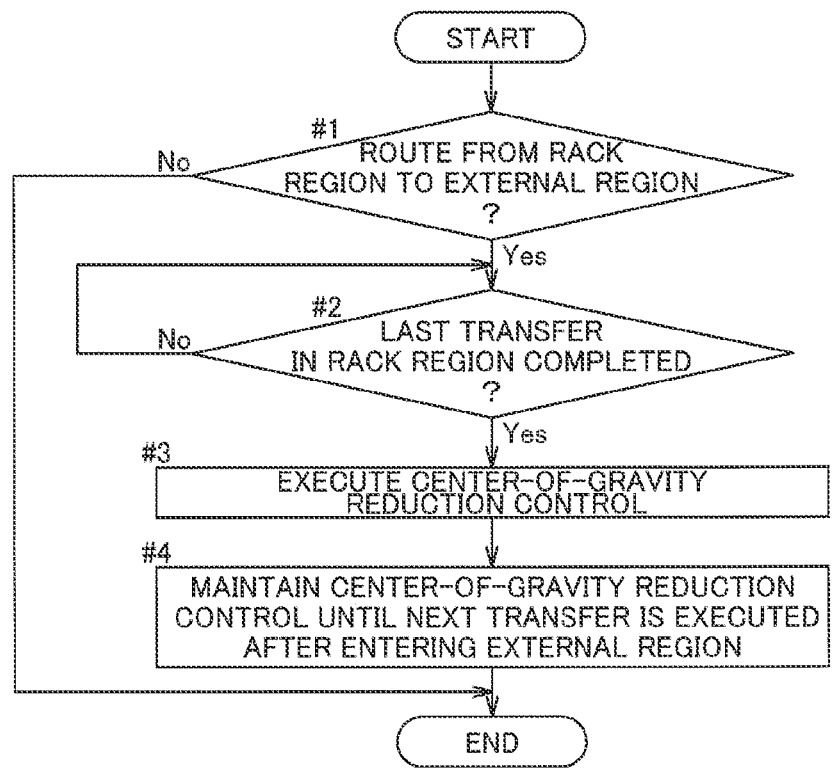
FIG. 16 is a flowchart showing the processing procedure for executing center-of-gravity reduction control.

As shown in FIG. 16, the control device C determines whether the route that the travel body 1 is currently traveling on is a route from the rack region IA to the external region OA (step #1). The route that the travel body 1 takes is included in a transport instruction that is transmitted from the host controller H, for example. In this case, the control device C performs determination of the route, based on the transport instruction.

If it is determined that the route that the travel body 1 is currently traveling on is not a route from the rack region IA to the external region OA (step #1: No), the control device C ends the routine. If it is determined that the route that the travel body 1 is currently traveling on is a route from the rack region IA to the external region OA (step #1: Yes), the control device C determines whether the last transfer in the rack region IA has been completed (step #2).

If it is determined that the last transfer in the rack region IA has not been completed (step #2: No), the control device C repeats the processing of step #2. If it is determined that the last transfer in the rack region IA has been completed (step #2: Yes), the control device C executes the center-of-gravity reduction control (step #3). The control device C then keeps executing the center-of-gravity reduction control until the transfer machine B performs the next transfer of containers 70 after the travel body 1 has left the external region OA and entered the rack region IA (step #4).

Suspension Structure of Travel Body

Figure 17:
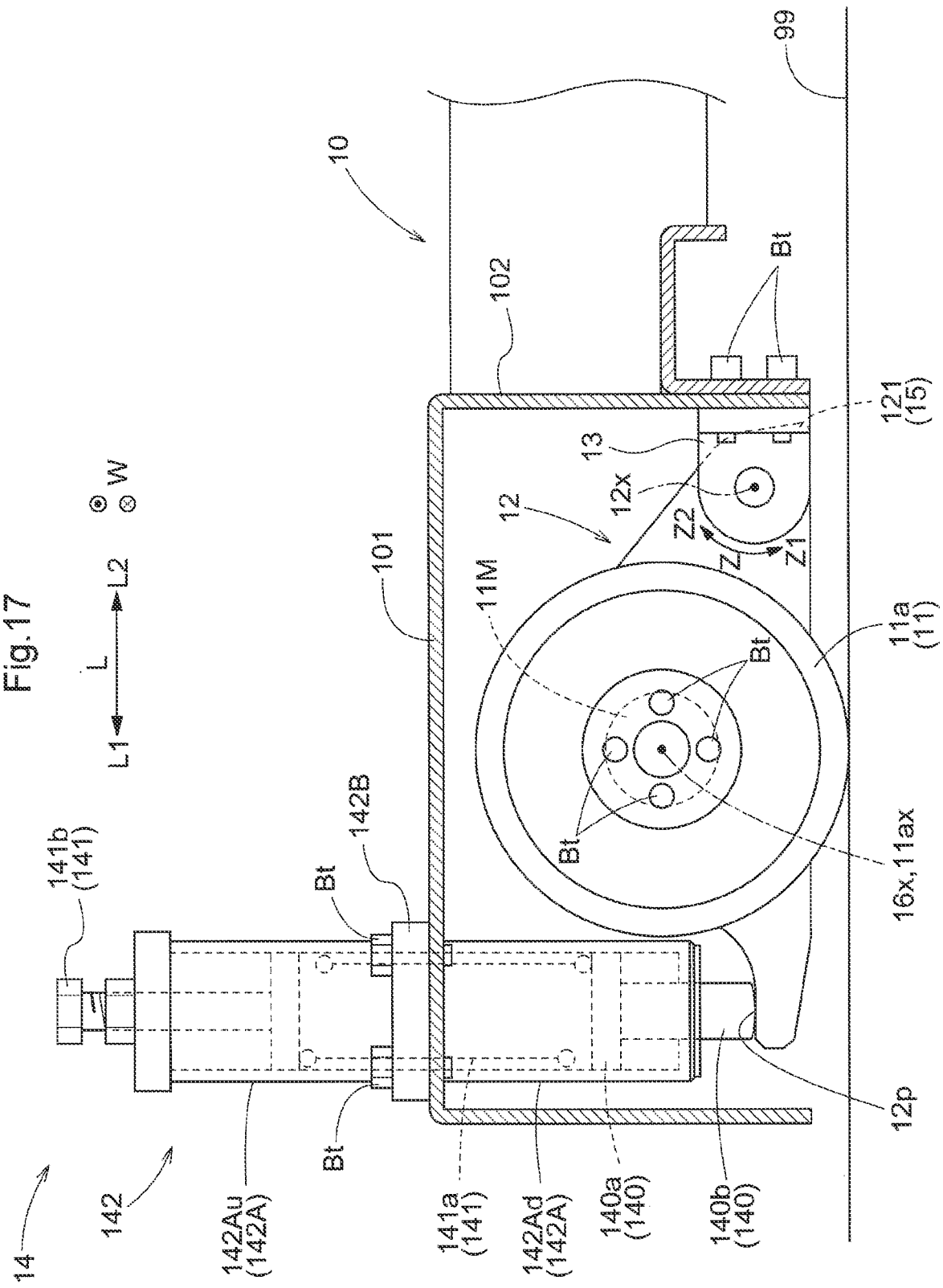
FIG. 17 is a view showing the peripheral structure of a drive wheel in the vehicle body width direction.
Figure 18:
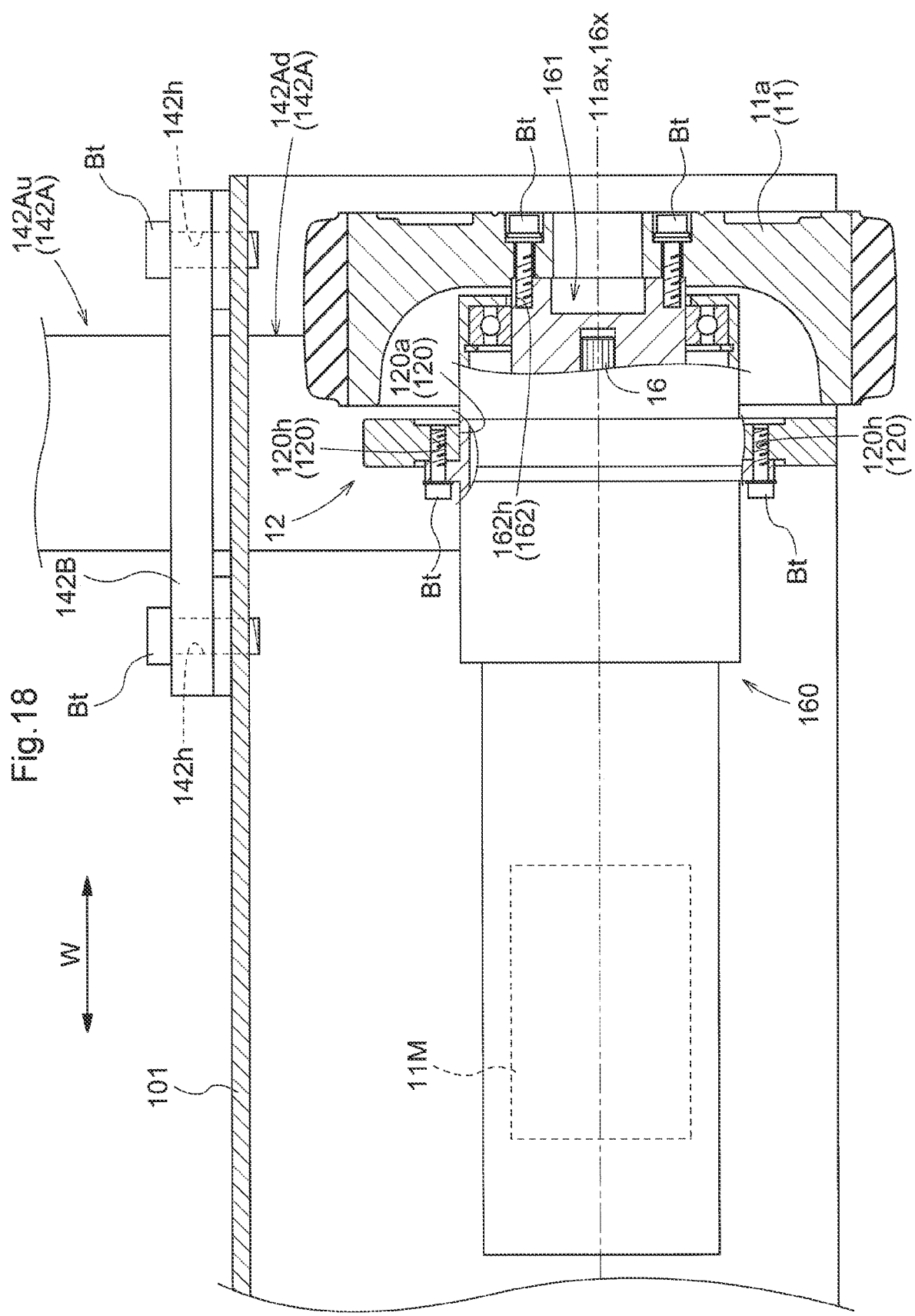
FIG. 18 is a cross-sectional view taken along XVIII-XVIII in FIG. 13.

The travel body 1 includes a suspension structure for facilitating bringing the travel wheels 11 in contact with the travel surface 99 and for absorbing vibration of the travel wheels 11 during traveling. The drive wheels 11a are provided with the suspension structure. In the present embodiment, the driven wheels 11b are not provided with the suspension structure. Hereinafter, the suspension structure of the travel body 1 will be described in detail with reference to FIGS. 17 and 18. FIG. 17 is an enlarged view showing the peripheral structure of the drive wheel 11a in the vehicle body width direction W. FIG. 18 is a cross-sectional view taken along XVIII-XVIII in FIG. 13.

The travel body 1 includes the travel body section 10, the drive wheels 11a, the wheel drive sources 11M that drive the drive wheels 11a, a support arm 12 that is swingable relative to the travel body section 10 and supports the drive wheel 11a and the wheel drive source 11M, a swing support 13 that is attached to the travel body section 10 and supports a swinging fulcrum 12x of the support arm 12, and an elastic unit 14.

Hereinafter, the direction in which the support arm 12 swings is given as "swing direction Z", and the side on which the drive wheel 11a is directed toward the travel surface 99 in the swing direction Z of the support arm 12 is given as "first side Z1 in the swing direction" and the opposite side thereto is given as "second side Z2 in the swing direction".

The support arm 12 is a member that supports the drive wheel 11a and the wheel drive source 11M. In the present embodiment, the support arm 12 supports the wheel drive source 11M and indirectly supports the drive wheel 11a via the wheel drive source 11M (see FIG. 18).

The axis of the swing fulcrum 12x of the support arm 12, or in other words, the swing axis of the support arm 12, is in parallel with a rotation axis 11ax of the drive wheel 11a. The support arm 12 swings in such a manner as to allow up-down movement of the drive wheel 11a when the travel body 1 travels on an uneven travel surface 99.

In the present embodiment, the swing fulcrum 12x of the support arm 12 is disposed on the side (second side L2 in the vehicle body length direction) closer to the transfer device 4 in the vehicle body length direction L, with respect to the central portion of the support arm 12 in the vehicle body length direction L (see also FIG. 14). The swing tip end section of the support arm 12 is disposed on the opposite side (first side L1 in the vehicle body length direction) to the transfer device 4 in the vehicle body length direction L, with respect to the central portion of the support arm 12 in the vehicle body length direction L (see also FIG. 14). In the present example, as will be described later, a target spot 12p where an abutting section 140 of the elastic unit 14 abuts the support arm 12 is set on the swing tip end section of the support arm 12. That is, the target spot 12p is disposed on the first side L1 in the vehicle body length direction, with respect to the central portion of the support arm 12 in the vehicle body length direction L.

In the present embodiment, a rotation axis 16x of an output shaft 16 of the wheel drive source 11M is in parallel with a rotation axis 11ax of the drive wheel 11a. Accordingly, the rotation axis 16x of the output shaft 16, the rotation axis 11ax of the drive wheel 11a and the swing axis of the support arm 12 are in parallel with one another. In the present example, the rotation axis 16x of the output shaft 16 of the wheel drive source 11M and the rotation axis 11ax of the drive wheel 11a are disposed on the same virtual axis. The swing axis of the support arm 12 is disposed on a different virtual axis to these rotation axes 16x and 11ax, and, in the present example, is disposed on the side (second side L2 in the vehicle body length direction) closer to the transfer device 4 in the vehicle body length direction L than are the rotation axes 16x and 11ax.

The swing support 13 is a member that supports the swing fulcrum 12x of the support arm 12. The swing support 13 is detachably attached to the travel body section 10. In the present embodiment, the travel body section 10 includes an upper surface section 101 that faces upwardly and a hanging wall section 102 that hangs down from the upper surface section 101. The swing support 13 is fixed to the hanging wall section 102 by bolts Bt (example of fastening member). Accordingly, the swing support 13 is attachable and detachable with respect to the hanging wall section 102, by fastening the bolts Bt and releasing the fastening of the bolts Bt. In the present example, the swing support 13 is fastened and fixed to the hanging wall section 102 by the bolts Bt in contact with the hanging wall section 102 from the first side L1 in the vehicle body length direction. The swing support 13 supports the swing fulcrum 12x of the support arm 12 on the first side L1 in the vehicle body length direction with respect to the hanging wall section 102. Although not illustrated in detail, the swing support 13 is dividable in the vehicle body width direction W, and is configured to support the swing fulcrum 12x of the support arm 12 by fitting onto the protrusion of the swing fulcrum 12x in such a manner as to sandwich the swing fulcrum 12x from the vehicle body width direction W. Accordingly, when the fastening of the swing support 13 has been released, the support arm 12 can be easily removed from the swing support 13.

In the present embodiment, the travel body 1 includes a swing restriction mechanism 15 that restricts swinging of the support arm 12 toward the travel surface 99 to a predetermined range. More specifically, the swing restriction mechanism 15 restricts swinging of the swing tip end section of the support arm 12 toward the travel surface 99 to a predetermined range.

In the present embodiment, the swing restriction mechanism 15 is part of the support arm 12. Specifically, a protruding section 121 that protrudes radially relative to the swing axis of the support arm 12 is provided on a portion of the support arm 12 where the swing fulcrum 12x is provided, and this protruding section 121 corresponds to the swing restriction mechanism 15. The protruding section 121 serving as the swing restriction mechanism 15 contacts the hanging wall section 102 and restricts further swinging of the swing tip end section (support arm 12), when the swing tip end section of the support arm 12 swings excessively toward the travel surface 99.

As shown in FIG. 18, the support arm 12 includes a drive source support section 120 that supports the wheel drive source 11M. The drive source support section 120 includes an open section 120a in which the wheel drive source 11M (specifically, drive source case 160 described later) is inserted and a bolt hole 120h (through hole) in which a bolt Bt for fastening the wheel drive source 11M to the support arm 12 is inserted. In the present example, the open section 120a is open in the direction (vehicle body width direction W) in which the rotation axis 16x of the output shaft 16 extends. A plurality of bolt holes 120h are dispersed in the circumferential direction of the support arm 12 around the open section 120a. The wheel drive source 11M is fastened to the support arm 12 by bolts Bt after being inserted into the open section 120a. This allows the support arm 12 to support the wheel drive source 11M.

In the present embodiment, the drive source case 160 houses the wheel drive source 11M. The output shaft 16 of the wheel drive source 11M is coupled to a rotatory section 161 that rotates relative to the drive source case 160. In the present example, the drive source case 160 is inserted into the above-described open section 120a and fastened to the support arm 12 by bolts Bt. Note that, in the present embodiment, the drive source case 160 also houses a deceleration mechanism (not shown) that decelerates rotation of the wheel drive source 11M, and the output shaft 16 is a shaft for outputting the driving force of the wheel drive source 11M that is transmitted via the deceleration mechanism.

In the present embodiment, the wheel drive source 11M supports the drive wheel 11a with a wheel support section 162 for supporting the drive wheel 11a. In the present example, the wheel support section 162 is provided on the above-described rotatory section 161. Accordingly, the wheel support section 162 rotates together with the rotatory section 161, and rotates relative to the support arm 12 and the drive source case 160. In the present embodiment, the wheel drive source 11M thus supports the drive wheel 11a via the rotatory section 161.

In the present embodiment, the wheel support section 162 includes a bolt hole 162h (through hole) in which a bolt Bt for fastening the drive wheel 11a to the rotatory section 161 is inserted. In the illustrated example, a plurality of bolt holes 162h are dispersed in the circumferential direction of the rotatory section 161 around the rotation axis 16x of the output shaft 16.

As shown in FIG. 17, the elastic unit 14 includes an abutting section 140 that abuts the target spot 12p located away from the swing fulcrum 12x in the support arm 12 from the second side Z2 in the swing direction, and an elastic section 141 that biases the abutting section 140 abutting the support arm 12 toward the swing direction 1 side Z1. Due to the abutting section 140 biased by the elastic section 141 abutting the support arm 12 with the weight of the travel body 1 at least partially supported by the drive wheel 11a, the drive wheel 11a supported by the support arm 12 is pushed toward the travel surface 99, thereby enabling the drive wheel 11a to be brought in contact with the travel surface 99. Thus, it is unlikely that the drive wheel 11a will lift up off the travel surface 99 and spin idly.

In the present embodiment, the target spot 12p is set on the opposite side to the swing fulcrum 12x across the rotation axis 11ax of the drive wheel 11a, in the extension direction of the support arm 12. The target spot 12p, which is where the abutting section 140 abuts the support arm 12, is thereby set at a position away from the swing fulcrum 12x in the extension direction of the support arm 12. Accordingly, with this configuration, the biasing force of the elastic section 141 that biases the abutting section 140 is easily kept small. Thus, the elastic unit 14 can be miniaturized. In the present embodiment, the target spot 12p is set on the swing tip end section of the support arm 12. The target spot 12p is thus disposed on the opposite side (first side L1 in the vehicle body length direction) to the transfer device 4 in the vehicle body length direction L, with respect to the central portion of the support arm 12 of the vehicle body length direction L (see also FIG. 14). Note that, as described above, the swing fulcrum 12x of the support arm 12 is disposed on the side (second side L2 in the vehicle body length direction) closer to the transfer device 4 in the vehicle body length direction L, with respect to the central portion of the support arm 12 in the vehicle body length direction L.

In the present embodiment, the target spot 12p is set on the upward facing surface of the support arm 12. Specifically, the target spot 12p is set on the upward facing surface of the swing tip end section of the support arm 12. The abutting section 140 abuts the target spot 12p from above, and the elastic section 141 biases the abutting section 140 downwardly. The abutting section 140 may be various shapes such as rod shaped, columnar and spherical. Although not illustrated in detail, the elastic section 141 includes a spring member such as a coil spring or a leaf spring, or an elastic body such as a rubber member.

In the present embodiment, the elastic unit 14 includes a fixed section 142 that is fixed to the travel body section 10. The fixed section 142 supports the abutting section 140 and the elastic section 141. In the present example, the fixed section 142 supports the abutting section 140 to be movable vertically and supports the elastic section 141 to be elastically deformable.

In the present embodiment, the fixed section 142 is fixed to the upper surface section 101 in the travel body section 10. The fixed section 142 is detachably attached to the upper surface section 101 by bolts Bt (example of fastening member). Here, as described above, the swing support 13 supporting the swing fulcrum 12x of the support arm 12 is detachably attached to the hanging wall section 102 of the travel body section 10 rather than the upper surface section 101. Thus, in the present embodiment, the elastic unit 14 is detachably attached to the travel body section 10, independently of the swing support 13.

In the present embodiment, the fixed section 142 includes a housing section 142A that houses the abutting section 140 and the elastic section 141 and a coupling section 142B that is coupled to the travel body section 10.

In the present embodiment, the coupling section 142B is formed in a flange shape protruding outwardly from the outer peripheral surface of the cylindrical housing section 142A. In the coupling section 142B, bolt holes 142h (through holes) are formed in which bolts Bt for fastening the fixed section 142 to the travel body section 10 (in the present example, upper surface section 101) are inserted. In the present example, a plurality of bolt holes 142h are dispersed in the coupling section 142B around the housing section 142A (see FIG. 18).

In the present embodiment, the housing section 142A is formed to be cylinder shaped, that is, cylindrical, and houses the abutting section 140 and the elastic section 141.

The abutting section 140 includes a piston section 140a formed in a piston shape movable vertically within the cylindrical housing section 142A, and a protruding section 140b that is formed to extend downwardly from the piston section 140a and protrudes downwardly from the lower end of the housing section 142A. In the present example, the lower end of the protruding section 140b abuts the target spot 12p of the support arm 12 from above.

The elastic section 141 biases the piston section 140a downwardly with respect to the housing section 142A. In the present example, the elastic section 141 includes a spring member 141a disposed vertically between an upper wall inside the housing section 142A and the piston section 140a. Here, the spring member 141a is a compression coil spring. In the present embodiment, the elastic section 141 includes an adjustment section 141b for adjusting the elastic force of the spring member 141a. Here, the adjustment section 141b is a bolt. In the present example, the compression amount of the compression coil spring serving as the spring member 141a can be increased to increase the elastic force, by tightening the bolt serving as the adjustment section 141b. Conversely, the compression amount of the compression coil spring serving as the spring member 141a can be reduced to reduce the elastic force, by loosening the bolt serving as the adjustment section 141b. The present invention is, however, not limited to the above-described configuration, and the spring member 141a may be disposed vertically between the lower wall inside the housing unit 142A and the piston section 140a. In this case, the spring member 141a is favorably a tensile coil spring.

In the present embodiment, the housing section 142A passes through the upper surface section 101 vertically, and includes an upwardly protruding section 142Au that protrudes upwardly from the upper surface section 101 and a downwardly protruding section 142Ad that protrudes downwardly from the upper surface section 101. Taking the direction orthogonal to the center line of the cylindrical housing section 142A as a cylindrical radial direction, the above-described coupling section 142B protrudes outwardly in the cylindrical radial direction from the outer peripheral surface of the upwardly protruding section 142Au.

The abutting section 140 housed in the housing unit 142A protrudes downwardly from the downwardly protruding section 142Ad. Thus, the housing unit 142A is disposed in a position corresponding to the target spot 12p of the support arm 12, such that the abutting section 140 is able to appropriately abut the target spot 12p of the support arm 12. As described above, the target spot 12p is disposed on the opposite side (first side L1 in the vehicle body length direction) to the transfer device 4 in the vehicle body length direction L, with respect to the central portion of the support arm 12 in the vehicle body length direction L. Accordingly, the housing section 142A is disposed on the opposite side (first side L1 in the vehicle body length direction) to the transfer device 4 in the vehicle body length direction L, with respect to the central portion of the vehicle body length direction L of the support arm 12. In the present embodiment, the housing unit 142A is disposed further on the transfer direction unloading side X1 than is the transfer device 4. As shown in FIG. 14, the transfer elevating body 40B disposed lowermost in the elevatable range VR and the members supported by the transfer elevating body 40B can thereby be prevented from interfering with the housing section 142A. Accordingly, even in the case of the control device C (see FIG. 6) executing the center-of-gravity reduction control for controlling the position of the transfer elevating body 40B to be located in the lower range UR set below the center of the elevatable range VR, as in the present embodiment, the presence of the housing section 142A, that is, the presence of the elastic unit 14 including the housing unit 142A, is unlikely to obstruct the center-of-gravity reduction control.

Removal of Members from Travel Body Section

With the technology according to the present disclosure, the support arm 12 and the drive wheel 11a and wheel drive source 11M can be easily removed from the travel body section 10. The maintainability of the drive wheel 11a and the support arm 12 which is the support mechanism of the drive wheel 11a can thereby be improved. Also, in the present embodiment, the elastic unit 14 can be removed from the travel body section 10 independently of the support arm 12, the drive wheel 11a and the wheel drive source 11M, and the maintainability of the elastic unit 14 can also be improved. Note that the above maintenance includes disassembling and cleaning of each member and replacement of each member. Hereinafter, the main points for when removing the respective members from the travel body section 10 will be described, with reference to FIGS. 19 to 22.

Figure 19:
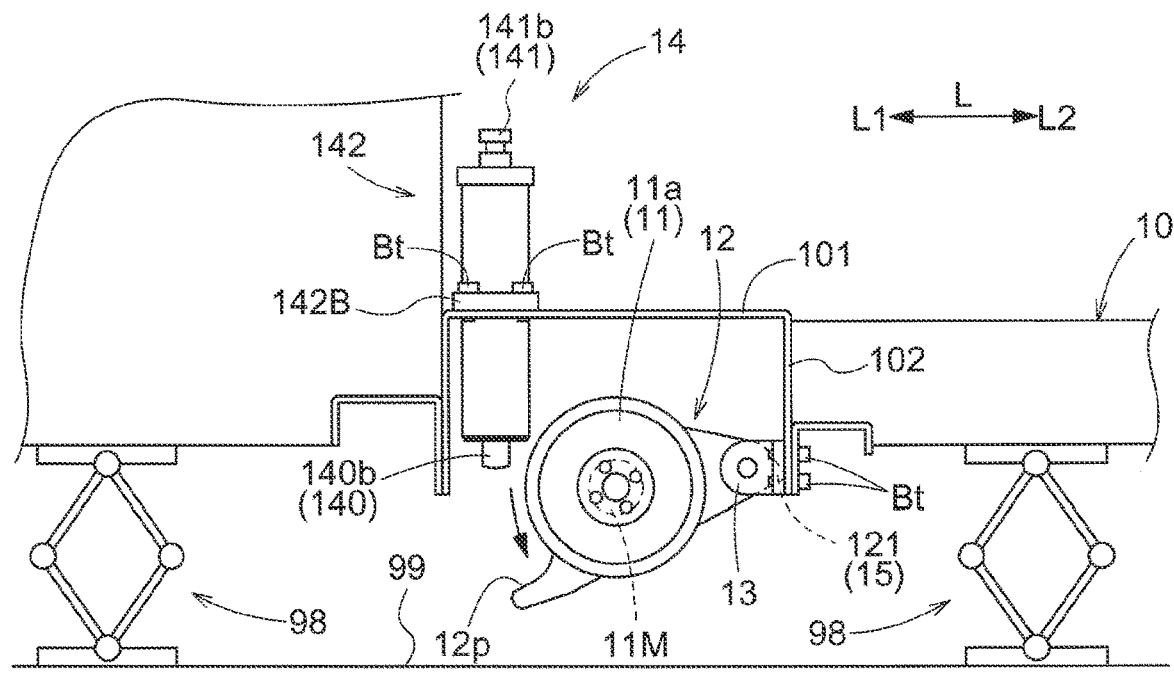
FIG. 19 is an illustrative view of removing a support arm from a travel body section.

When removing the support arm 12 and the drive wheel 11a and wheel drive source 11M from the travel body section 10, it is preferable to first lift the drive wheel 11a up off the travel surface 99. As shown in FIG. 19, for example, lifters 98 are disposed between the travel body section 10 and the travel surface 99, and the travel body section 10 is lifted up by the lifters 98. The drive wheel 11a will thereby be disposed upwardly of the travel surface 99 in a raised state.

When the drive wheel 11a has been lifted up off the travel surface 99, the support arm 12 swings toward the travel surface 99 due to the action of gravity. The abutting section 140 of the elastic unit 14 and the target spot 12p (swing tip end section of the support arm 12) on the support arm 12 are thereby located away from one another. In this state, the support arm 12 is not affected by the elastic force 141 of the elastic unit 14. Accordingly, the elastic force of the elastic section 141 is unlikely to obstruct, when removing the support arm 12 from the travel body section 10.

Also, as described above, the travel body 1 includes the swing restriction mechanism 15 that restricts swinging of the support arm 12 toward the travel surface 99 to a predetermined range. In the present embodiment, in the case where the swing tip end section of the support arm 12 swings excessively toward the travel surface 99, the protruding section 121 serving as the swing restriction mechanism 15 contacts the hanging wall section 102 and further swinging of the swing tip end section (support arm 12) is restricted. As shown in FIG. 19, the inclination angle of the support arm 12 can thereby be restricted to a predetermined range by regulating the support arm 12 in such a manner as to not hang down greatly (e.g., vertically) from the travel body section 10. Accordingly, when removing the support arm 12 from the travel body section 10, the support arm 12 can be prevented from contacting the travel surface 99, with the travel body section 10 raised off the travel surface 99 by the lifters 98. Therefore, the support arm 12 is easily removed.

Figure 20:
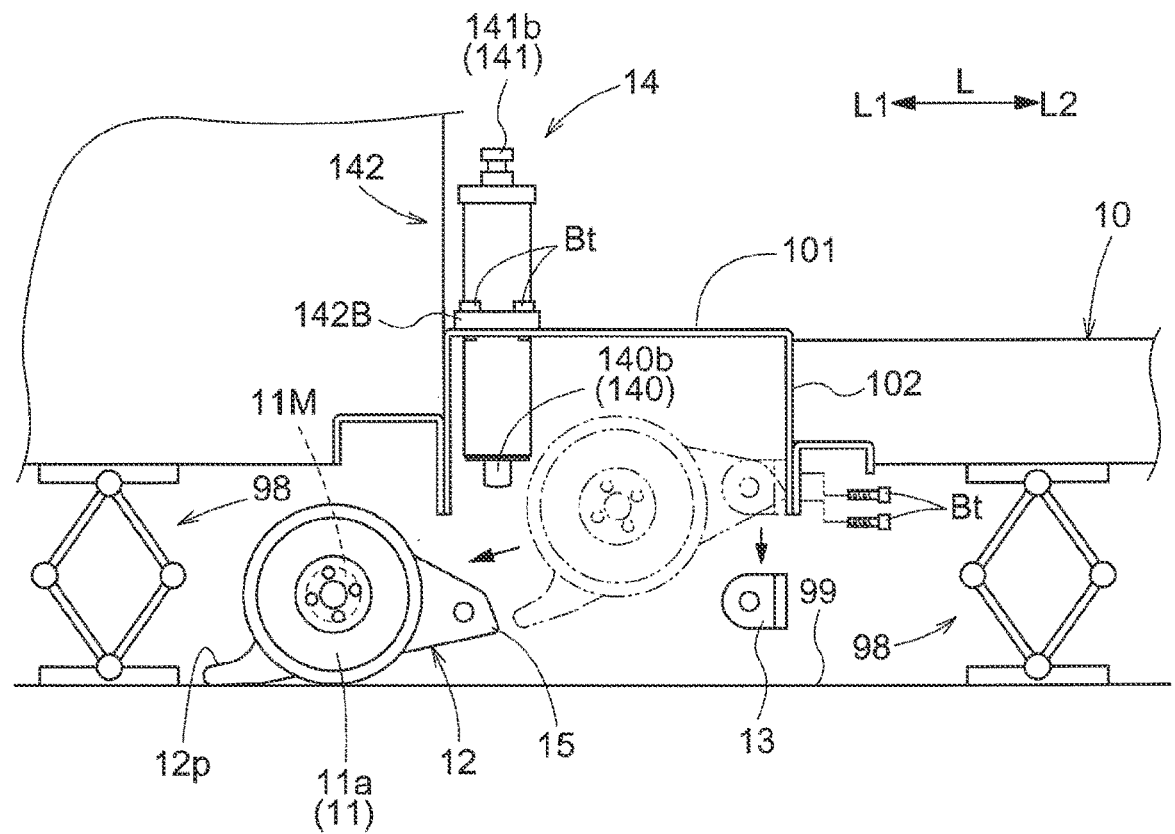
FIG. 20 is an illustrative view of removing the support arm from the travel body section.

With the technology according to the present disclosure, by swinging the support arm 12 toward the travel surface 99, the support arm 12 can thus be regulated in such a manner as to not hang down greatly from the travel body section 10, while separating the abutting section 140 of the elastic unit 14 from the support arm 12. Accordingly, the support arm 12 is easily removed from the travel body section 10. Here, the support arm 12 supports the wheel drive source 11M, and the wheel drive source 11M supports the drive wheel 11a. Accordingly, removing the support arm 12 from the travel body section 10 enables the drive wheel 11a and the wheel drive source 11M to also be removed from the traveling main body unit 10. As shown in FIG. 20, the support arm 12 is removed by removing the bolts Bt that fasten the swing support 13 to the hanging wall section 102 (travel body section 10). Fastening of the swing support 13 to the hanging wall section 102 is thereby released, and the support arm 12 and the drive wheel 11a and wheel drive source 11M can be removed from the travel body section 10, together with the swing support 13. Note that, in the case of attaching the support arm 12, the drive wheel 11a and the wheel drive source 11M to the travel body section 10, the swing support 13 is fastened to the hanging wall section 102 (travel body section 10) with the bolts Bt, while the swing fulcrum 12x of the support arm 12 is supported by the swing support 13.

Figure 21:
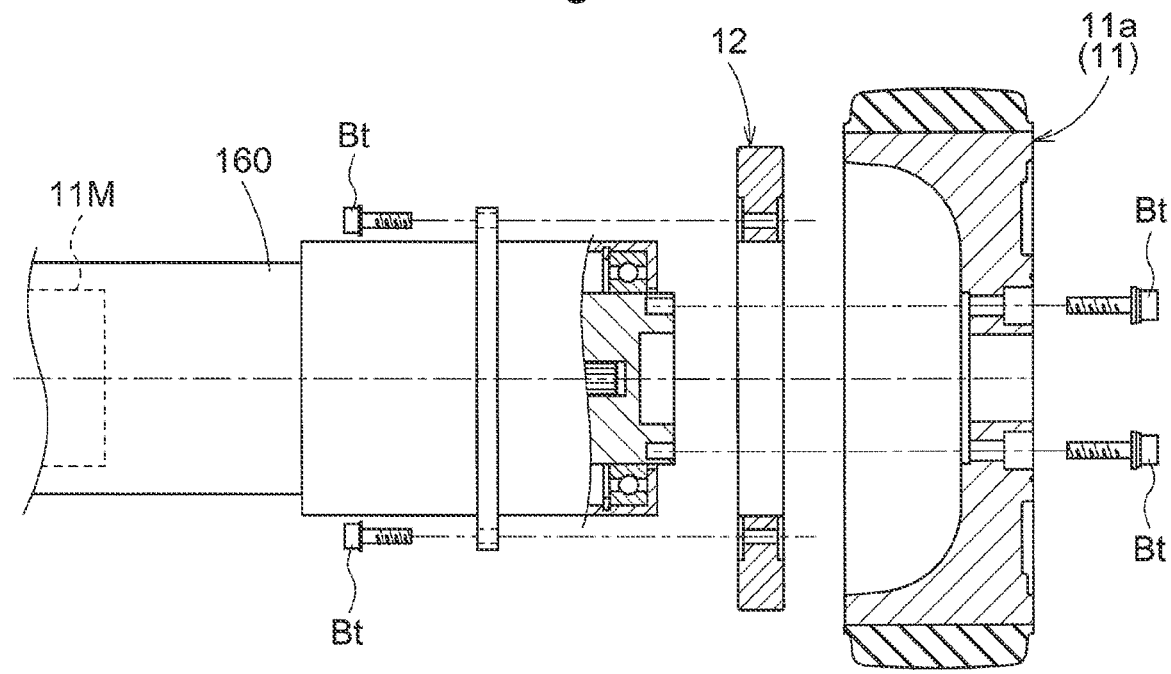
FIG. 21 is an illustration view of removing the drive wheel and a wheel drive source from the support arm.

According to the present embodiment, the support arm 12, the drive wheel 11a and the wheel drive source 11M removed from the travel body section 10 can be easily disassembled. As shown in FIG. 21, the drive wheel 11a can be removed from the wheel drive source 11M, by removing the bolts Bt fastening the drive wheel 11a to the wheel drive source 11M. Also, the wheel drive source 11M can be removed from the support arm 12, by removing the bolts Bt fastening the wheel drive source 11M to the support arm 12. In the present embodiment, the support arm 12, the drive wheel 11a and the wheel drive source 11M can thus be easily disassembled, which is favorable in the case of performing maintenance on these members separately.

Figure 22:
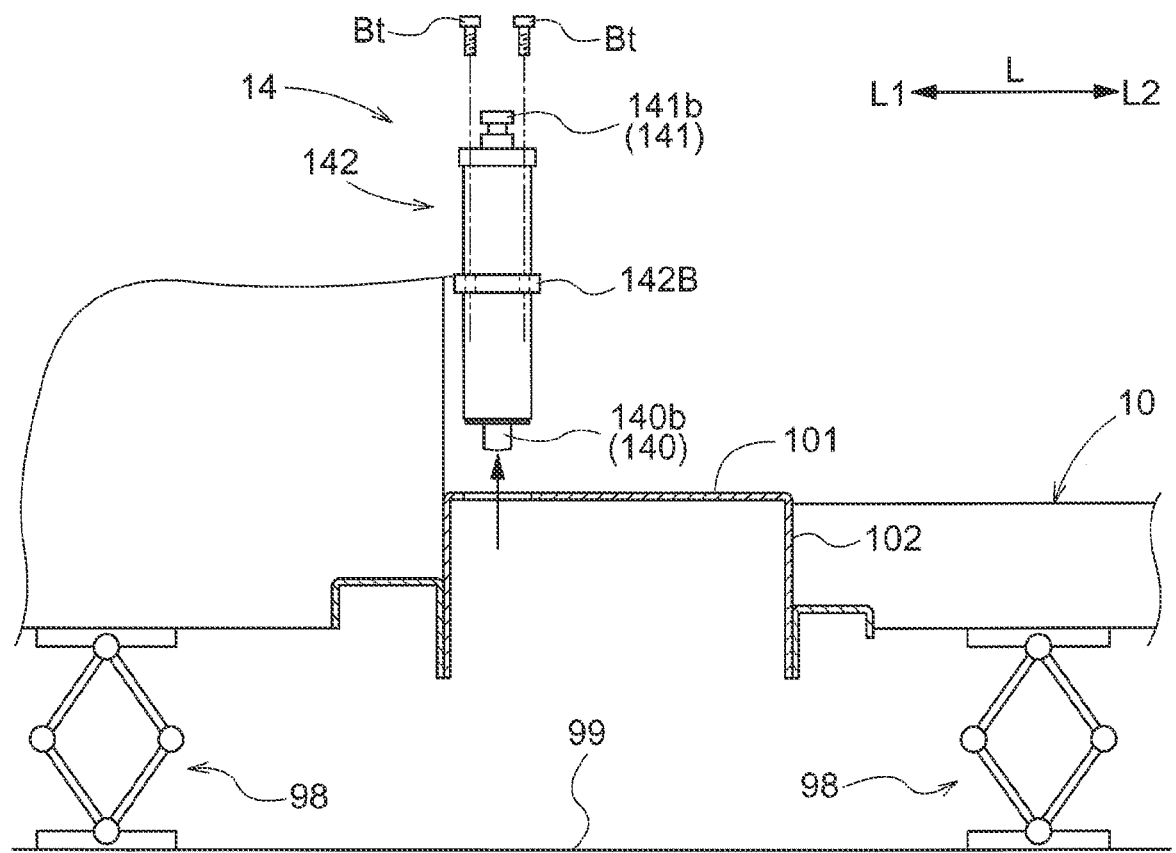
FIG. 22 is an illustrative view of removing an elastic unit from the travel body section.

Also, according to the present embodiment, the elastic unit 14 can be easily removed from the travel body section 10, independently of the support arm 12, the drive wheel 11a and the wheel drive source 11M. As shown in FIG. 22, the elastic unit 14 can be removed from the travel body section 10, by removing the bolts Bt fastening the fixed section 142 of the elastic unit 14 to the upper surface section 101 (travel body section 10). In the present embodiment, the elastic unit 14 can thus be easily removed from the travel body section 10, which is suitable for performing maintenance on the elastic unit 14 individually. Note that, in the case of removing the elastic unit 14 from the travel body section 10 without removing the support arm 12 from the travel body section 10, it is good to reduce the pressing force of the abutting section 140 on the support arm 12 by reducing the elastic force of the elastic section 141 with the adjustment section 141b beforehand. This enables the elastic unit 14 to be easily removed from the travel body section 10, with the elastic force of the elastic section 141 being unlikely to obstruct the removal of the elastic unit 14.

Other Embodiments

Next, other embodiments of the transport vehicle will be described.

(1) The above embodiment describes an example in which the swing fulcrum 12x of the support arm 12 is disposed on the side (second side L2 in the vehicle body length direction) closer to the transfer device 4 in the vehicle body length direction L, with respect to the central portion of the front and rear L of the support arm 12, and the swing tip end section of the support arm 12 is disposed on the opposite side (first side L1 in the vehicle body length direction) to the transfer device 4 in the vehicle body length direction L, with respect to the central portion of the support arm 12 in the vehicle body length direction L. However, the present invention is not limited to such an example, and the positional relationship between the swing fulcrum 12x of the support arm 12 and the swing tip end section of the support arm 12 may be the opposite of that described above.

(2) The above embodiment describes an example in which the target spot 12p is set on the opposite side to the swing fulcrum 12x across the rotation axis 11ax of the drive wheel 11a, in the extension direction of the support arm 12. However, the present invention is not limited to such an example, and the target spot 12p may be set on the same side as the swing fulcrum 12x with respect to the rotation axis 11ax of the drive wheel 11a, in the extension direction of the support arm 12.

(3) The above embodiment describes an example in which the abutting section 140 abuts the target spot 12p from above, and the elastic section 141 biases the abutting section 140 downwardly. However, the present invention is not limited to such an example, and the orientation of the abutting section 140 and the target spot 12p and the biasing direction of the elastic section 141 may be set such that the abutting section 140 biases the drive wheel 11a supported by the support arm 12 toward the travel surface 99. For example, the target spot 12p may be formed on the surface of the support arm 12 facing the second side Z2 in the swing direction (e.g., surface facing horizontally), and the abutting section 140 may bias the target spot 12p toward the first side Z1 in the swing direction with the elastic section 141.

(4) The above embodiment describes an example in which the rotation axis of the rotation axis 16x of the output shaft 16 of the wheel drive source 11M is in parallel with the rotation axis 11ax of the drive wheel 11a. However, the present invention is not limited to such an example, and the rotation axis 16x of the output shaft 16 of the wheel drive source 11M and the rotation axis 11ax of the drive wheel 11a may intersect one another. Such a configuration can be realized by driving and coupling the output shaft 16 of the wheel drive source 11M and the shaft of the drive wheel 11a via a gear mechanism in which a pair of bevel gears engage, for example.

(5) The above embodiment describes an example in which, in the case where the rotation axis 16x of the output shaft 16 of the wheel drive source 11M is in parallel with the rotation axis 11ax of the drive wheel 11a, these two rotation axes 16x and 11ax are disposed on the same virtual axis. However, the present invention is not limited to such an example, and in the case where the rotation axis 16x of the output shaft 16 of the wheel drive source 11M is in parallel with the rotation axis 11ax of the drive wheel 11a, these two rotation axes 16x and 11ax may be disposed on different virtual axes from one another. Such a configuration can be realized by driving and coupling the output shaft 16 of the wheel drive source 11M and the shaft of the drive wheel 11a via a gear mechanism in which a pair of spur gears engage, for example.

(6) The above embodiment describes an example in which the elastic unit 14 is detachably attached to the travel body section 10, independently of the swing support 13. However, the present invention is not limited to such an example, and the elastic unit 14 may be fixed to the travel body section 10 in an undetachable manner.

(7) The above embodiment describes an example in which the swing restriction mechanism 15 is part of the support arm 12. However, the present invention is not limited to such an example, and the swing restriction mechanism 15 may be separate from the support arm 12.

(8) The above embodiment describes an example in which the travel body 1 includes the swing restriction mechanism 15 that restricts swinging of the support arm 12 toward the travel surface 99 to a predetermined range. However, the present invention is not limited to such an example, and the travel body 1 may not include a swing restriction mechanism 15 such as the above.

(9) Note that the configuration disclosed in the aforementioned embodiment can also be applied in combination with the configurations disclosed in the other embodiments provided there are no inconsistencies. As for the other configurations, the embodiments disclosed herein are merely illustrative in all respects. Accordingly, various modifications can be made as appropriate, without departing from the spirit of the disclosure.

Summary of the Embodiments

Hereinafter, the transport vehicle illustrated above will be described.

A transport vehicle for transporting an article, including:
a travel body configured to travel on a travel surface, whereby the travel body includes a travel body section; a drive wheel; a wheel drive source configured to drive the drive wheel; a support arm swingable relative to the travel body section and supporting the drive wheel and the wheel drive source; a swing support attached to the travel body section and supporting a swing fulcrum of the support arm; and an elastic unit, the swing support is detachably attached to the travel body section, and the elastic unit includes an abutting section configured to abut, from a second side in the swing direction, a target spot located away from the swing fulcrum of the support arm; and an elastic section configured to bias the abutting section abutting the support arm toward a first side in the swing direction, the first side being a side on which the drive wheel is directed toward the travel surface in a swing direction of the support arm, the second side being a side opposite to the first side.

With this configuration, due to the abutting section biased by the elastic section abutting the support arm with the drive wheel at least partially supporting the weight of the travel body, the drive wheel supported by the support arm is pushed toward the travel surface, enabling the drive wheel to be brought in contact with the travel surface. It is thereby unlikely that the drive wheel will lift up off the travel surface and spin idly. The abutting section only abuts the support arm as described above, and is not integrally coupled with the support arm. Thus, by removing the swing support supporting the swing fulcrum of the support arm from the travel body section, the support arm together with the drive wheel and wheel drive source supported thereby can be removed from the travel body section independently of the elastic unit including the abutting section and the elastic section. Accordingly, this configuration enables the support arm and the drive wheel and wheel drive source to be easily removed from the travel body section, with little chance of being affected by the elastic force of the elastic section. Accordingly, the maintainability of the drive wheel and the support mechanism of the drive wheel can be improved.

Here, the elastic unit is favorably detachably attached to the travel body section, independently of the swing support.

With this configuration, the elastic unit can be removed from the travel body section independently of the support arm, the drive wheel and the wheel drive source. Accordingly, the maintainability of the elastic unit can also be improved.

Also, the wheel drive source includes an output shaft, and the output shaft and the drive wheel favorably have respective rotation axes parallel to each other.

With this configuration, the wheel drive source and the drive wheel can be easily removed from the travel body section, by being moved in the same direction (direction of rotation axis). Also, the travel body section does not need to be raised much when removing these sections. Accordingly, the maintainability of the drive wheel and the support mechanism of the drive wheel can be further improved.

Also, the target spot is favorably opposite to the swing fulcrum across the rotation axis of the drive wheel in a direction in which the support arm extends.

With this configuration, the target spot where the abutting section abuts the support arm is set at a position away from the swing fulcrum in the extension direction of the support arm. Accordingly, the biasing force of the elastic section that biases the abutting section is easily kept small.

Also, the target spot is favorably on an upward facing surface of the support arm, and the elastic section favorably biases the abutting section downwardly.

With this configuration, the elastic section is easily disposed vertically. Accordingly, the dimensions of the elastic unit in plan view can be reduced.

Also, the travel body favorably includes a swing restriction mechanism configured to restrict swing of the support arm toward the travel surface to a predetermined range.

With this configuration, even in the case where the travel body section is raised off the travel surface by a lifter or the like, the inclination angle of the support arm can be maintained at a predetermined angle by regulating the amount by which the support arm hangs down from the travel body section. Accordingly, the support arm, the drive wheel and the wheel drive source can be easily removed with the travel body section raised off the travel surface.

The technology according to the present disclosure can be utilized in transport vehicles for transporting articles.

What is claimed is:

1. A transport vehicle for transporting an article, comprising:
   a travel body configured to travel on a travel surface,
   wherein the travel body comprises:
   a travel body section;
   a drive wheel;
   a wheel drive source configured to drive the drive wheel;
   a support arm swingable relative to the travel body section and supporting the drive wheel and the wheel drive source;
   a swing support attached to the travel body section and supporting a swing fulcrum of the support arm; and
   an elastic unit,
   wherein the swing support is detachably attached to the travel body section, and
   wherein the elastic unit comprises:
   an abutting section configured to abut, from a second side in the swing direction, a target spot located away from the swing fulcrum of the support arm; and
   an elastic section configured to bias the abutting section abutting the support arm toward a first side in the swing direction,
   wherein the first side is a side on which the drive wheel is directed toward the travel surface in a swing direction of the support arm,
   wherein the second side is a side opposite to the first side,
   wherein the abutting section is not coupled to the target spot, and
   wherein the swing support supports the swing fulcrum in such a manner that the support arm is swingable toward the first side to a position where the target spot is separate from the abutting section.

2. The transport vehicle according to claim 1, wherein the elastic unit is detachably attached to the travel body section independently of the swing support.

3. The transport vehicle according to claim 1, wherein the wheel drive source comprises an output shaft, and
   wherein the output shaft and the drive wheel have respective rotation axes parallel to each other.

4. The transport vehicle according to claim 1, wherein the target spot is opposite to the swing fulcrum across a rotation axis of the drive wheel in a direction in which the support arm extends.

5. The transport vehicle according to claim 1,
wherein the target spot is on an upward facing surface of the support arm, and
wherein the elastic section biases the abutting section downwardly.

6. The transport vehicle according to claim 1,
wherein the travel body comprises a swing restriction mechanism configured to restrict swing of the support arm toward the travel surface to a predetermined range.

7. The transport vehicle according to claim 1,
wherein the swing support is detachably attached to the travel body section by a fastening member.

8. The transport vehicle according to claim 1,
wherein the elastic unit further includes a housing section that houses the abutting section and the elastic section, and
wherein the abutting section includes a piston section and a protruding section that is formed to extend downwardly from the piston section and protrudes downwardly from a lower end of the housing section.

9. The transport vehicle according to claim 1,
wherein the drive wheel and the wheel drive source are disposed on opposite sides of the support arm.

\* \* \* \* \*